US009482760B2

(12) United States Patent
Lennen

(10) Patent No.: US 9,482,760 B2
(45) Date of Patent: Nov. 1, 2016

(54) RECEIVER FOR SIMULTANEOUS RECEPTION OF SIGNALS FROM MULTIPLE GNSS SATELLITE SYSTEMS

(71) Applicant: Samsung Electronics Co., Ltd., Gyeonggi-do (KR)

(72) Inventor: Gary Lennen, Cupertino, CA (US)

(73) Assignee: Samsung Electronics Co., Ltd (KR)

( * ) Notice: Subject to any disclaimer, the term of this patent is extended or adjusted under 35 U.S.C. 154(b) by 572 days.

(21) Appl. No.: 14/012,258

(22) Filed: Aug. 28, 2013

(65) Prior Publication Data

US 2014/0368379 A1 Dec. 18, 2014

Related U.S. Application Data

(60) Provisional application No. 61/834,143, filed on Jun. 12, 2013.

(51) Int. Cl.
*G01S 19/42* (2010.01)
*G01S 19/33* (2010.01)

(52) U.S. Cl.
CPC .............. *G01S 19/33* (2013.01); *G01S 19/426* (2013.01)

(58) Field of Classification Search
CPC .............................. G01S 19/23; G01S 19/246
USPC ................................................... 342/357.25
See application file for complete search history.

(56) References Cited

U.S. PATENT DOCUMENTS

| | | | | |
|---|---|---|---|---|
| 5,101,416 A * | 3/1992 | Fenton | ................... | G01S 19/21 375/150 |
| 7,358,896 B2 | 4/2008 | Gradincic et al. | | |
| 7,764,226 B1 * | 7/2010 | Veitsel | ................... | G01S 19/33 342/357.73 |
| 7,999,732 B2 * | 8/2011 | Kishimoto | ............ | G01S 19/235 342/357.46 |
| 2010/0141519 A1 | 6/2010 | Rodal | | |
| 2011/0057834 A1 * | 3/2011 | Miller | ................... | G01S 19/37 342/357.25 |
| 2011/0181467 A1 * | 7/2011 | Samavati | ................ | G01S 19/33 342/357.73 |
| 2011/0181468 A1 * | 7/2011 | Sun | ........................ | G01S 19/30 342/357.73 |
| 2012/0026039 A1 | 2/2012 | Ganeshan et al. | | |

OTHER PUBLICATIONS

Borio, Daniele et al., Data and Pilot . . . , Hindawai Publishing Corporation, International Journal of Navigation and Observation, vol. 2008, Article ID 738183, 12 pages.
Maxim Universal GPS Receiver, Copyright 2007 Maxim Integrated Products, 19-0791; Rev 0; Jun. 2007, pp. 24.
Principe, Fabio et al., Software-Defined . . . , Hindawi Publishing Corporation, International Journal of Navigation and Observation, vol. 2011, Article ID 979815, 27 pages.
Jakubov, Ondrej et al., The Witch Navigator—A Low Cost GNSS Software Receiver . . . , RadioEngineering, vol. 19, No. 4, Dec. 2010, pp. 536-543.

* cited by examiner

*Primary Examiner* — Frank J McGue
(74) *Attorney, Agent, or Firm* — The Farrell Law Firm, P.C.

(57) ABSTRACT

A method, receiver, and mobile terminal for simultaneously receiving and processing signals of multiple satellites from a plurality of navigational satellite system constellations are described. In the method, satellite signals from a plurality of navigational satellite systems are translated into an intermediate frequency and converted from analog to digital together, but then are separated out according to each navigational satellite system in the digital domain.

26 Claims, 11 Drawing Sheets

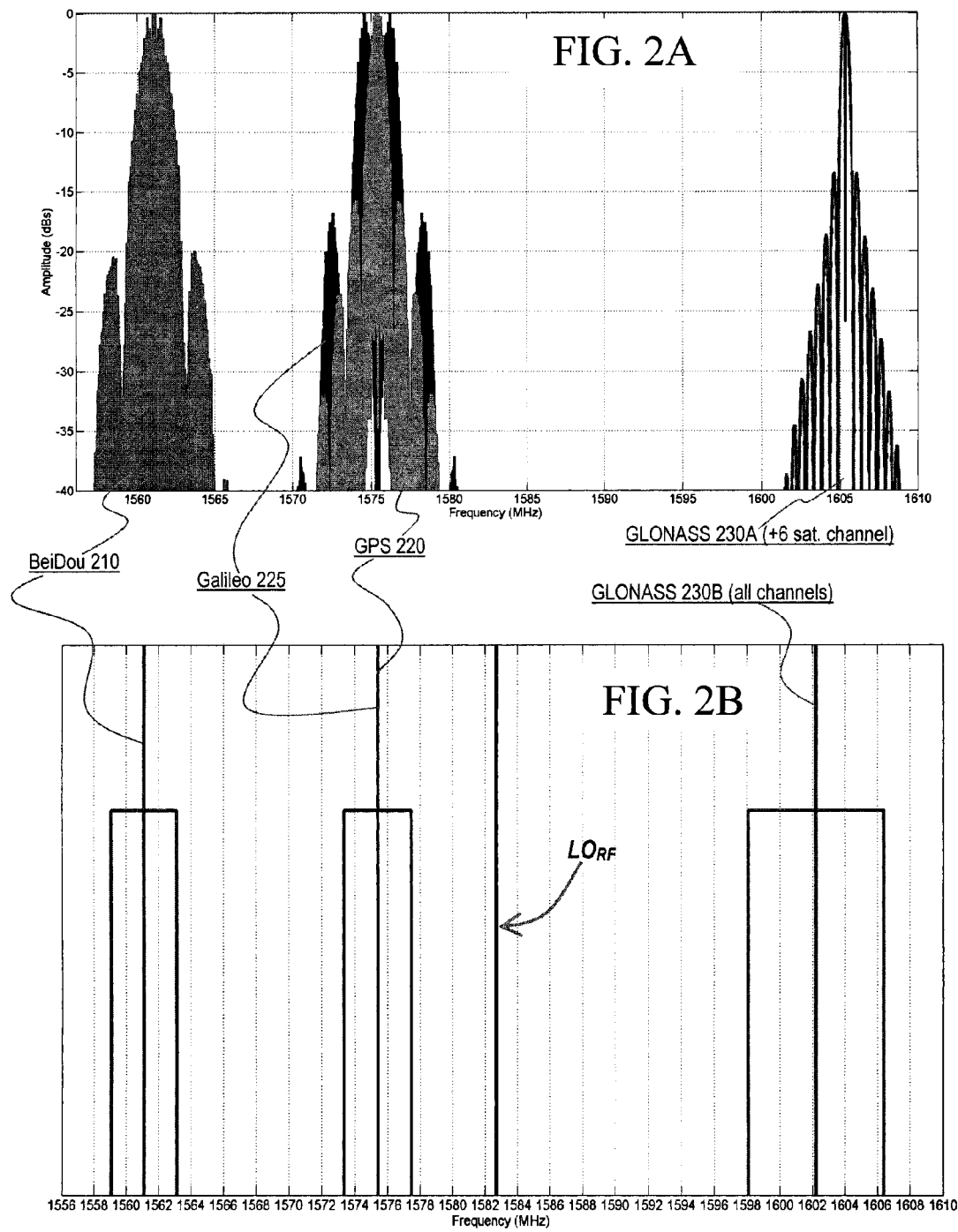

RECEIVER FOR SIMULTANEOUS RECEPTION OF SIGNALS FROM MULTIPLE GNSS SATELLITE SYSTEMS

PRIORITY

This application claims priority under 35 U.S.C. §119(e) to U.S. Provisional Patent Application Ser. No. 61/834,143 filed on Jun. 12, 2013, the entire disclosure of which is incorporated herein by reference.

BACKGROUND OF THE INVENTION

1. Field of the Invention

The present invention relates generally to receiving signals from satellite navigational systems, and more particularly, to the simultaneous reception of signals from satellites of multiple Global Navigational Satellite Systems' (GNSS) constellations.

2. Description of the Related Art

Satellite navigational systems provide positional and timing information to earth-bound receivers. Each system has its own constellation of satellites orbiting the Earth, and, in order to calculate its position, a receiver on Earth uses the satellites "in view" (i.e., in the sky above) from that system's constellation. Global Navigational Satellite Systems (GNSS) is often used as the generic term for such systems, even though such navigational satellite systems include regional and augmented systems—i.e., systems that are not truly "global." The term "GNSS," as used herein, covers any type of navigational satellite system, global or not, unless expressly indicated otherwise.

The number of GNSS systems, both planned and presently operational, is growing. The widely-known, widely-used, and truly global Global Positioning System (GPS) of the United States has been joined by one other global system, Russia's GLObalnaya NAvigatsionnaya Sputnikovaya Sistema (GLONASS), and is presently being joined by Europe's Galileo and China's BeiDou (also known, in its second generation, as COMPASS) systems—each of which has, or will have, its own constellation of satellites orbiting the globe. Regional systems (those that are not global, but intended to cover only a certain region of the globe) include Japan's Quasi-Zenith Satellite System (QZSS) and the Indian Regional Navigational Satellite System (IRNSS) currently being developed. Augmented systems are normally regional as well, and "augment" existing GNSS systems with, e.g., messages from ground-based stations and/or additional navigational aids. These include the Wide Area Augmentation System (WAAS), European Geostationary Navigation Overlay Service (EGNOS), Multi-functional Satellite Augmentation System (MSAS), and GPS Aided Geo Augmented Navigation (GAGAN). Regional GNSS systems, such as QZSS, can also operate as augmented systems.

The four operating or soon-to-be-operating truly "global" GNSSs, i.e., GPS, GLONASS, Galileo, and BeiDou, are providing, and/or will be providing, an unprecedented number of satellites overhead by which a GNSS receiver can calculate its position using the "open service" channels transmitted by each GNSS system. GPS transmits an open service L1 signal, and had 32 working satellites in its constellation as of December 2012, which constitute 24 operational satellites, with 4 satellites in 6 different orbital planes, guaranteeing there are at least 6 overhead at any time at any spot on Earth. GLONASS transmits an open service L1 signal, and, as of July 2013, has 29 satellites in its constellation, with 23 being operational. Galileo transmits an open service E1 signal, and has 30 satellites planned, spread out in three orbital planes, and intends to guarantee there will be 6-8 overhead at any time at "most locations." BeiDou-2, also known as COMPASS, transmits an open service B1 signal, and will have 35 satellites in its constellation.

Thus, in the near future, a minimum of 30 and a maximum of more than 50 satellites may be available overhead for a GNSS receiver at any time—if the GNSS receiver is capable of receiving signals from all four GNSS systems. However, the various GNSS systems use different signal structures, and most of them use different frequencies, making the simultaneous reception of signals from satellites in all 4 GNSS constellations difficult without excessive power consumption and/or receiver apparatus complexity.

Thus, a solution is needed for a GNSS receiver to simultaneously receive satellite signals from all 4 GNSS constellations, without excessive power needs and/or undue device complexity.

SUMMARY OF THE INVENTION

The present invention addresses at least the problems and disadvantages described above and provides at least the advantages described below. According to one aspect of the invention, a GNSS receiver is configured to simultaneously receive signals from multiple GNSS constellations. According to another aspect of the present invention, a single analog reception chain is used in a GNSS receiver to simultaneously receive and process signals from multiple GNSS constellations. According to yet another aspect of the present invention, signals from multiple GNSS constellations are separated out from each other only after the received signal containing all of the signals from the multiple GNSS constellations has been converted from analog to digital.

According to an aspect of the present invention, a method for a receiver in a satellite navigational system to receive signals of multiple satellites from a plurality of satellite system constellations is provided, including receiving a radiofrequency (RF) signal comprising transmissions from multiple satellites in the plurality of satellite system constellations; translating the RF signal comprising transmissions from the multiple satellites in the plurality of satellite system constellations to an intermediate frequency (IF) signal comprising transmissions from the multiple satellites in the plurality of satellite system constellations by mixing the RF signal with a local oscillator-derived signal $LO_{RF}$; sampling the IF signal at a sampling rate $f_s$ to convert the analog IF signal to a digital IF signal; and separating out, for each satellite system, signals of satellites of the satellite system from the digital IF signal by mixing the digital IF signal with a numerically-controlled oscillator (NCO) output signal $f_{NCO\text{-}GNSS}$, the NCO output signal $f_{NCO\text{-}GNSS}$ having a frequency corresponding to a center of a transmission frequency of the satellites in the satellite system after translation to the IF.

According to another aspect of the present invention, a reception chain in a satellite navigational system receiver is provided, including a receiver configured to receive a radiofrequency (RF) signal comprising transmissions from the multiple satellites in a plurality of satellite system constellations; a complex mixer configured to mix the received RF signal with a local oscillator-derived signal $LO_{RF}$, generating an output of an intermediate frequency (IF) signal comprising the transmissions from multiple satellites in the plurality of satellite system constellations; an analog-to-digital convertor (ADC) configured to sample the IF signal at a sampling rate $f_s$ to convert the analog IF signal to a digital IF signal; and a complex mixer configured to mix the digital IF signal with a numerically-controlled oscillator (NCO) output signal $f_{NCO\text{-}GNSS}$, the NCO output signal $f_{NCO\text{-}GNSS}$ having a frequency corresponding to a center of a transmission frequency at IF of satellites in a target satellite system of the plurality of satellite systems, thereby separating out signals of satellites of the target satellite system from the digital IF signal.

According to another aspect of the present invention, a receiver in a satellite navigational system is provided, including one or more processors and at least one non-transitory computer-readable medium having program instructions recorded thereon, the program instructions configured to have the one or more processors control performance of one or more steps of receiving a radiofrequency (RF) signal comprising transmissions from multiple satellites in a plurality of satellite system constellations; translating the RF signal comprising transmissions from the multiple satellites in the plurality of satellite system constellations to an intermediate frequency (IF) signal comprising transmissions from the multiple satellites in the plurality of satellite system constellations by mixing the RF signal with a local oscillator-derived signal $LO_{RF}$; sampling the IF signal at a sampling rate $f_s$ to convert the analog IF signal to a digital IF signal; and separating out, for each satellite system, signals of satellites of the satellite system from the digital IF signal by mixing the digital IF signal with a numerically-controlled oscillator (NCO) output signal $f_{NCO\text{-}GNSS}$, the NCO output signal $f_{NCO\text{-}GNSS}$ having a frequency corresponding to a center of a transmission frequency of the satellites in the satellite system after translation to the IF.

According to another aspect of the present invention, a mobile terminal capable of receiving signals of multiple satellites from a plurality of navigational satellite system constellations is provided, including a receiver configured to receive a radio frequency (RF) signal comprising signals of the multiple satellites from the plurality of navigational satellite systems $GNSS_1$-$GNSS_n$; a complex mixer configured to mix the received RF signal with a local oscillator-derived signal $LO_{RF}$, generating an output of an intermediate frequency (IF) signal comprising the signals of the multiple satellites from the plurality of navigational satellite systems $GNSS_1$-$GNSS_n$; an analog-to-digital convertor (ADC) configured to sample the IF signal at a sampling rate $f_s$ to convert the analog IF signal to a digital IF signal; and a plurality of complex mixers, each complex mixer i being configured to mix the digital IF signal with a numerically-controlled oscillator (NCO) output signal $f_{NCO\text{-}GNSSi}$, the NCO output signal $f_{NCO\text{-}GNSSi}$ having a frequency corresponding to a center of a transmission frequency at IF of satellites in navigational satellite system $GNSS_i$ of the plurality of navigational satellite systems $GNSS_1$-$GNSS_n$, whereby the plurality of complex mixers can separate out signals of satellites in each of the plurality of navigational satellite systems $GNSS_1$-$GNSS_n$ from the digital IF signal.

BRIEF DESCRIPTION OF THE DRAWINGS

The above and other aspects, features and advantages of certain embodiments of the present invention will be more apparent from the following detailed description taken in conjunction with the accompanying drawings, in which:

FIG. 2A is a graph showing the signals transmitted by, and received from, satellites of the GPS, Galileo, GLONASS, and BeiDou system constellations (GPS/Gal/GLO/Bei);

FIG. 2B is a graphical representation of the signals transmitted by GPS/Gal/GLO/Bei satellites, and the local oscillator (LO) frequency $LO_{RF}$, according to an embodiment of the invention;

DETAILED DESCRIPTION OF EMBODIMENTS OF THE PRESENT INVENTION

Figure 1A:
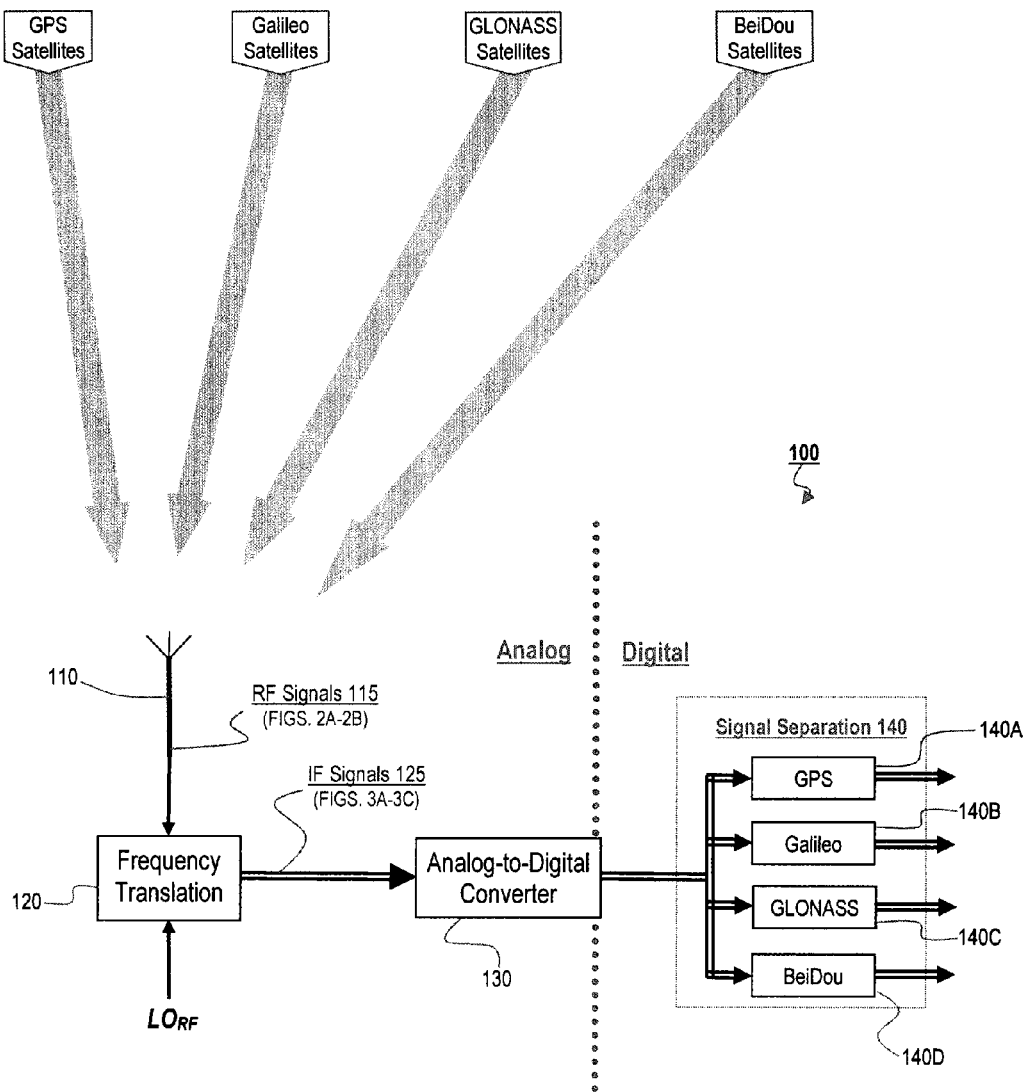
FIG. 1A illustrates a receiver chain for a GNSS system which is receiving and processing signals from four GNSS constellations, according to an embodiment of the present invention.

Various embodiments of the present invention will be described in detail below with reference to the accompanying drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

In general, the present application relates to a GNSS receiver simultaneously receiving and processing signals from satellites of multiple GNSS constellations, as well as augmented systems, with minimal circuitry and maximum flexibility. More specifically, embodiments of the present invention include the following combination of features:

(1) a single radiofrequency (RF)/intermediate frequency (IF) receive chain for receiving signals from satellites of multiple GNSS constellations, while reducing the bandwidth at IF to minimal values before sampling, which is also performed at a minimum rate;

(2) digital circuitry capable of processing all of the complex GNSS signals such that each of the GNSS system signals is optimally separated in terms of its own signal characteristics (including the L-band carrier transmit frequency and spreading code);

(3) digital circuitry having components which can be enabled and disabled based on which GNSS systems signals are selected for reception; and (4) an optional bandstop filter which can be used to further reduce the GNSS receiver's sensitivity to interfering signals.

FIG. 1A illustrates a receiver chain for a GNSS system which is receiving and processing signals from four GNSS constellations, according to an embodiment of the present invention. Specifically, antenna 110 is receiving signals from satellites in the GPS, Galileo, GLONASS, and BeiDou systems (hereinafter, "GPS/Gal/GLO/Bei"). The characteristics of those received signals, RF Signals 115, will be described in reference to FIGS. 2A-2B. FIG. 2A is a graph showing the signals transmitted by, and received from, satellites in the GPS/Gal/GLO/Bei constellations. Of course, as would be understood by one of ordinary skill in the art, FIG. 2A shows a simplified version of the received GPS/Gal/GLO/Bei signals. For example, as with all signals, these signals are always received with noise, and, in fact, the GPS signal when received is below the thermal noise floor. This and other well-known details of GNSS signals and systems are excluded from the description herein as making the description unnecessarily complex.

As shown in FIGS. 2A and 2B, BeiDou open service signal B1 210 has a nominal center frequency of 1561.098 MHz, with a 1 dB bandwidth of about 4.092 MHz (meaning that the power of the signal rolls off by 1 dB at that width), which is shown in the graphical representation of FIG. 2B by a single line indicating the nominal frequency and a box indicating the 1 dB roll-off bandwidth. The most current Interface Control Document (ICD) for BeiDou open service signal B1 is the BEIDOU NAVIGATION SATELLITE SYSTEM SIGNAL IN SPACE INTERFACE CONTROL DOCUMENT, dated December 2012, which is hereby incorporated by reference in its entirety.

GPS L1 signal 220 and Galileo E1 signal 225 overlap in FIGS. 2A and 2B because they share the same nominal center frequency of 1575.42 MHz, but the darker regions on FIG. 2A show where Galileo signal 225 differs from GPS signal 220. The most current ICD for GPS is the GLOBAL POSITIONING SYSTEMS DIRECTORATE SYSTEMS ENGINEERING & INTEGRATION INTERFACE SPECIFICATION (IS-GPS-200G), dated Jan. 31, 2013, which is hereby incorporated by reference in its entirety. The most current ICD for Galileo is the GALILEO OPEN SERVICE SIGNAL IN-SPACE INTERFACE CONTROL DOCUMENT (Galileo OS SIS ICD) Issue 1.1, dated September 2010, which is hereby incorporated by reference in its entirety.

GLONASS L1 signal 230B has a nominal center frequency of 1602 MHz, but, in its present incarnation, GLONASS uses frequency division multiplexing (FDM) rather than code division multiplexing (CDM) to differentiate its satellites' signals. More specifically, GLONASS has 14 L1/L2 satellite channels with center transmission frequencies at multiples of ±0.5625 MHz from the center frequency 1602 MHz. The GLONASS 230A signal shown in FIG. 2A is the +6 satellite channel with a center frequency at 1605.375 MHz, which is used here to indicate the highest transmission frequency of all the GLONASS FDM channels. Future incarnations of GLONASS may use CDM to differentiate its' satellite signals. As with the other GNSS signals, the principles of the present invention apply to both the present incarnation and any future incarnations, with modifications that would be obvious to one of ordinary skill in the art. The GLONASS 230B signal shown in FIG. 2B is a graphical representation of the bandwidth covered by all of the 14 FDM channels centered around 1602 MHz. Because of its use of FDM to differentiate channels, the graphical representation of all GLONASS channels (GLONASS signal 230B) has a wider bandwidth than the other GNSS signals, roughly 8 MHz. The most recent, publicly available ICD for GLONASS L1 and L2 signals in English is the GLOBAL NAVIGATION SATELLITE SYSTEM INTERFACE CONTROL DOCUMENT (Edition 5.1), dated 2008, which is hereby incorporated by reference in its entirety.

Returning to FIG. 1A, the GPS/Gal/GLO/Bei signals RF 115 (shown as 210, 220, 225, and 230B in FIG. 2B), having been received by antenna 110, are input into Frequency Translation module 120. Frequency translation is a very well-known process in radio reception, and involves the translation of the higher frequency received signal, herein called the "radiofrequency" or "RF" signal, to a lower frequency, herein called the "intermediate frequency" or "IF." There are many reasons for performing frequency translation, one of the primary ones being that it is easier to manipulate and process the signals at a lower frequency. This frequency translation is performed by mixing the RF signal with a signal generated by a local oscillator (LO), where the frequency of that LO signal will be designated herein as $LO_{RF}$. The many means and variations that are possible when performing frequency translation, as well as the stages and steps which may occur in the reception chain before, during, and after frequency translation, are well-known to one of ordinary skill in the art and do not need further explanation here.

As shown in FIG. 2B, the $LO_{RF}$ chosen, in accordance with an embodiment of the present invention, is approximately in the middle of the desired 4 GPS/Gal/GLO/Bei GNSS signals. More specifically, $LO_{RF}$ is nominally chosen to be $1547f_x$, where $f_x$ the frequency of the local oscillator, $=1.0230625$ MHz, and thus $LO_{RF}=1582.6776875$ MHz, as shown in FIG. 2B.

Since the $LO_{RF}$ signal is complex, i.e., having in-phase (I) and quadrature (Q) components, the output of Frequency Translation module 120 is also complex, which is indicated by the double-lined output of IF signals 125 in FIG. 1A. All complex signals in FIG. 1A are indicated by double lines.

Figure 3A:
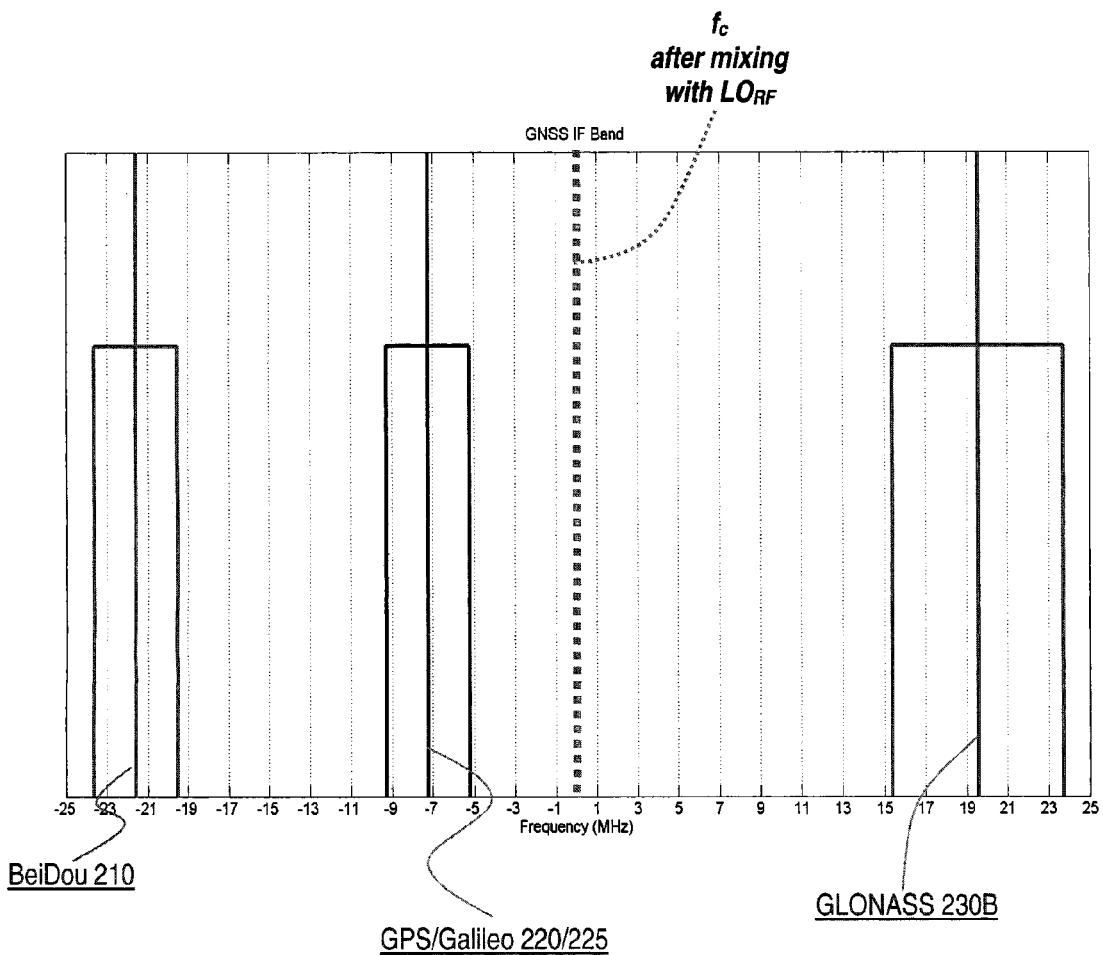
FIG. 3A is a graphical representation of the GPS/Gal/GLO/Bei intermediate frequency (IF) signals generated by frequency translation, and the center IF frequency $f_c$, according to an embodiment of the invention.
Figure 3B:
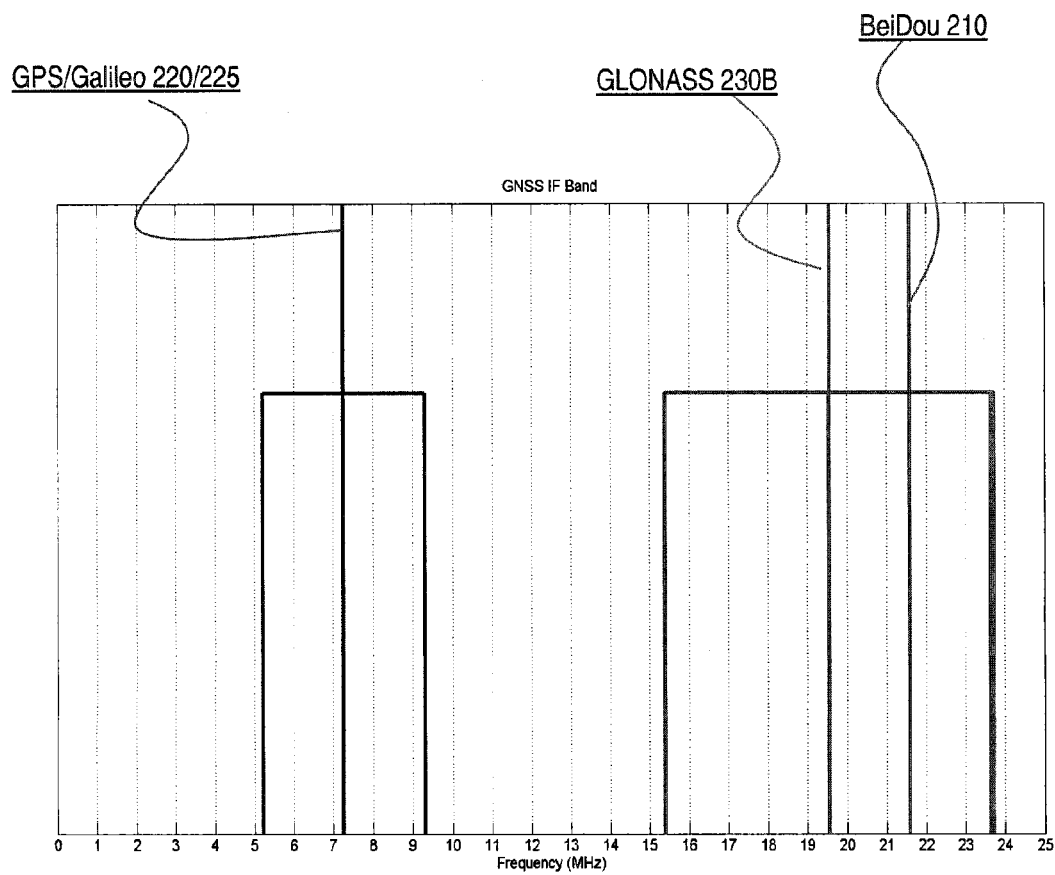
FIG. 3B is a graphical representation of the overlapping GPS/Gal/GLO/Bei IF signals generated by frequency translation, according to an embodiment of the invention.
Figure 3C:
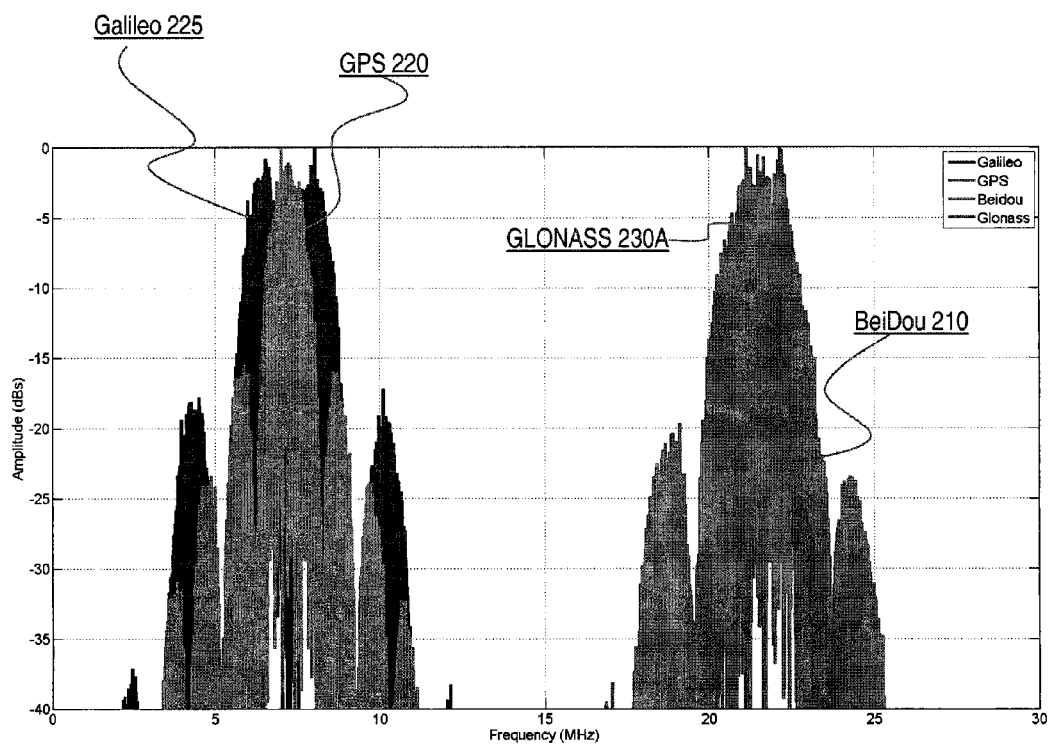
FIG. 3C is a graph showing the overlapping GPS/Gal/GLO/Bei IF signals generated by frequency translation, according to an embodiment of the invention.

FIGS. 3A-3B-3C are graphical representations and a graph of the GPS/Gal/GLO/Bei IF signals 125 output by Frequency Translation module 120. Having mixed the RF signals 115 with the $LO_{RF}$ signal, the resulting IF signals 125 are now centered around a much lower IF center frequency $f_c$, which is indicated by the center zero line shown in FIG. 3A. The spectrum of FIG. 3A, showing the output IF signals 125, is complex, with both positive and negative frequency components. However, in actual practice, the positive and negative frequencies fold over onto one another, resulting in the overlapping signals shown in FIG. 3B. More specifically, the BeiDou signals 210 shown centered at about −22 MHz in FIG. 3A are actually centered at about +22 MHz in FIG. 3B, causing them to overlap the GLONASS signals 230B centered at around 19.5 MHz in FIG. 3B. FIG. 3C shows the overlap of GLONASS 230A (the +6 GLONASS satellite channel) and BeiDou 210 in terms of amplitude (dB).

Returning to FIG. 1A, the IF signals 125 output by Frequency Translation module 120 are next input to Analog-to-Digital Converter (ADC) 130. Once again, analog-todigital conversion is a process very well-known to those of ordinary skill in the art, and obviously involves the conversion of an analog signal to a digital signal, meaning that the signal is now represented by 1's and 0's. There are many reasons for performing analog-to-digital conversion, one of the primary ones being that it is easier to manipulate and process the signals in the digital domain. The many means and variations that are possible when performing analog-to-digital conversion, as well as the stages and steps which may occur in the reception chain before, during, and after analog-to-digital conversion, are well-known to one of ordinary skill in the art and do not need further explanation here.

Once converted to the digital domain, IF signals 125 (still complex, as shown by the double lines in FIG. 1A) are input to Signal Separation module 140, comprising GPS signal separator 140A, Galileo signal separator 140B, GLONASS signal separator 140C, and BeiDou signal separator 140D. Each signal separator 140A-140B-140C-140D receives the same digital signal output from ADC 130. Partially because this digital output is complex, i.e., having I and Q components, the apparent overlap of signals shown in FIGS. 3B and 3C can be unraveled by the digital circuitry in GPS signal separator 140A, Galileo signal separator 140B, GLONASS signal separator 140C, and BeiDou signal separator 140D. Further details concerning Signal Separation module 140 will be discussed below in reference to the specific embodiment of Signal Separation module 440 shown in FIGS. 4B and 4C.

GPS signal separator 140A, Galileo signal separator 140B, GLONASS signal separator 140C, and BeiDou signal separator 140D separate out the GPS, Galileo, GLONASS, and BeiDou signals, respectively, and output them so that the separate signals can be used for navigational processing and calculation appropriate for each GNSS system. In general, each signal separator separates out its own target GNSS system of satellite signals.

As indicated above, FIG. 1A is a high-level abstraction of the components involved in the system according to an embodiment of the present invention, and the many components and stages which may be necessary to, and/or preferred in, a GNSS reception chain, as are well-known to one of ordinary skill in the art, have been omitted for clarity of presentation. For example, certain amplification and filtering is necessary before and after Frequency Translation module 120 and ADC 130, as is well-known to one of ordinary skill in the art, but not shown in FIG. 1A. Some of that amplification and filtering is discussed below in reference to the specific embodiment shown in FIGS. 4A, 4B, and 4C. Generally speaking, the specific implementation of the present invention in the reception chain of a particular GNSS receiver will always involve many well-known reception chain components in addition to those shown in FIG. 1A, as would be understood by those of ordinary skill in the art.

Figure 1B:
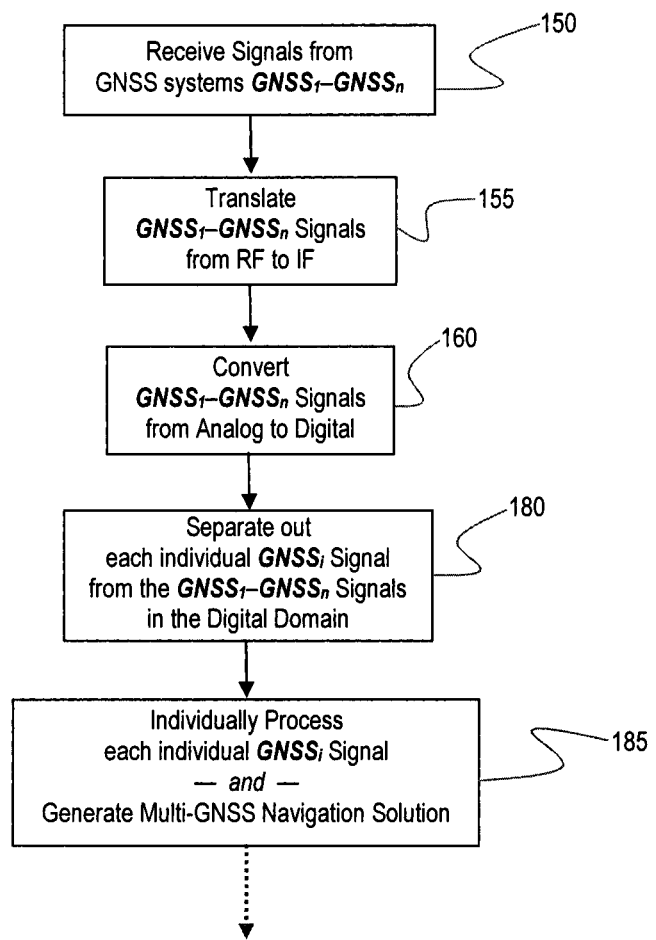
FIG. 1B is a flowchart of a method for receiving and processing signals from four GNSS constellations, according to an embodiment of the present invention.
Figure 1C:
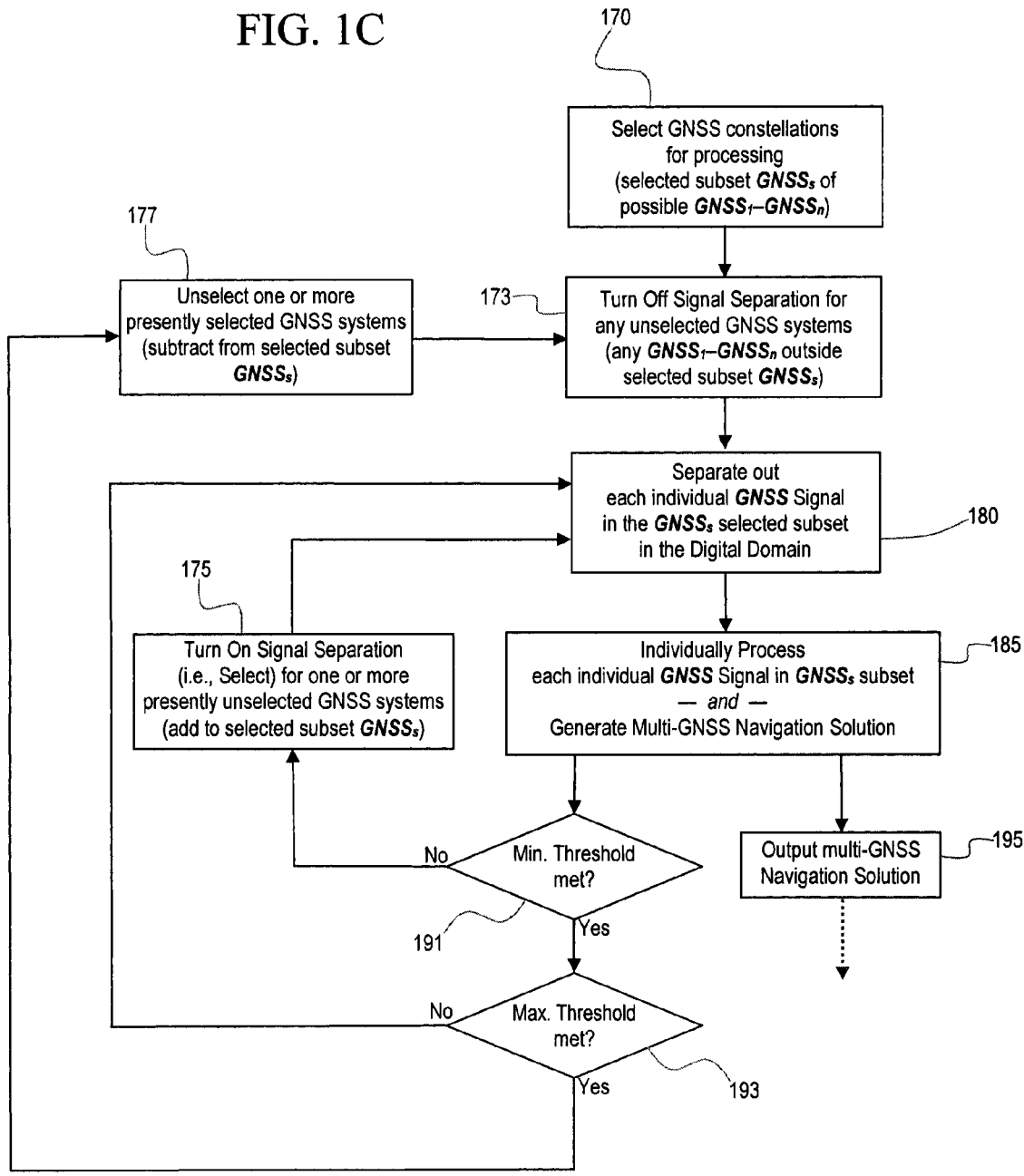
FIG. 1C is a flowchart of a method for selecting which GNSS constellations to use for GNSS calculations, according to an embodiment of the present invention.

FIG. 1B is a flowchart of a method for receiving and processing signals from multiple GNSS constellations, according to an embodiment of the present invention. In step 150, the GNSS signals from the constellations of satellites in n number of GNSS systems $GNSS_1$-$GNSS_n$ are received by the GNSS receiver. In step 155, the received RF signals are translated by Frequency Translation module 120 (using $LO_{RF}$) into IF signals. In step 160, IF signals 125 comprising the signals from all GNSS systems $GNSS_1$-$GNSS_n$ are converted from analog to digital by ADC 130. In step 180, the still-combined $GNSS_1$-$GNSS_n$ digital signals are separated out into the signals for each individual GNSS system $GNSS_i$ by Signal Separation module 140. In step 185, the separated-out signals for each individual GNSS system $GNSS_i$ output by Signal Separation module 140 are individually processed, according to their respective GNSS signaling structures and protocols, for GNSS calculation, and then a multi-GNSS navigation solution is computed (using all of the information generated from the signals from all GNSS systems $GNSS_1$-$GNSS_n$). As indicated by the dotted arrow out of step 185 in FIG. 1B, what happens next depends on the particular implementation and system involved. However, as is true with most GNSS systems, steps 150-155-160-180-185 would most likely be continually and/or intermittently repeating in order to, inter alia, update positional information. Having the method "end" after step 185 would be a misleading simplification. FIG. 1C is one example of the steps that might occur, after and before steps 180 and 185, in a particular multi-GNSS system.

FIG. 1C is a flowchart of a method for selecting which GNSS constellations to use for GNSS calculations, according to an embodiment of the present invention. In step 170, the GNSS constellations whose signals will be used for navigational/positional calculations are selected (i.e., subset $GNSS_S$ selected from possible $GNSS_1$-$GNSS_n$). What subset $GNSS_S$ is selected, and when the system will choose to select less than all possible GNSS systems, may depend on a number of different metrics, which may be chosen, mixed, and varied depending on the particular embodiment, as would be understood by one of ordinary skill in the art. For example, to minimize GNSS receiver power consumption, and/or if the GNSS signal conditions are good, the system may choose to limit signal processing to one or two GNSS systems. As another example of when the system may select (or be automated to select) less than all available GNSS systems, or a single GNSS system, is when there is augmented information available through other communication channels for that particular GNSS systems or systems. For example, if augmented GNSS information, such as current GPS/GLONASS ephemerides, were available through an available cell network, the GNSS system or systems with available augmented information may be selected. As an example of a selection parameter, the system may select the GNSS system with the most satellites presently in view (or, from the previous example, the GNSS system with available augmented information). Variations on this example would include embodiments that considered such factors as the maintenance and upkeep of the satellites in the GNSS system with the most satellites in view. As another example of a selection parameter, regional mandates may be applied. China, for example, may mandate that Beidou be the primary navigational source for freight trucking in China.

In step 173, the signal separation components of those GNSS constellations which were not selected in step 170 are turned off (i.e., any $GNSS_1$-$GNSS_n$ outside of selected subset $GNSS_S$). For example, if GPS, Galileo, and GLONASS were selected in step 170, the components in the BeiDou Signal Separator 140D are turned off in step 173. In step 180 (which is identical to step 180 in FIG. 1B), the signals of the selected subset are separated out, as discussed in reference to FIGS. 1A and 1B (i.e., each individual signal in the selected subset $GNSS_S$ is separated out). Following the previous example, in step 180, the selected GPS, Galileo, and GLONASS information would be separated out and output by Signal Separation module 140, while the BeiDou components remained disabled. In step 185 (which is identical to step 185 in FIG. 1B), the separated-out signals output by Signal Separation module 140 are individually processed, according to their respective GNSS signaling structures and protocols, for GNSS calculation, and then a multi-GNSS navigation solution is computed, using all of the information generated from the signals of the selected constellations. Following the previous example, the GPS, Galileo, and GLONASS signals separated-out and output by Signal Separation module 140 are individually processed, according to their respective GNSS signaling structures and protocols, for GNSS calculation, and then a multi-GNSS navigation solution is computed (using all of the information generated from the signals of the selected GPS, Galileo, and GLONASS constellations of satellites).

Next, the multi-GNSS navigation solution computed in step 185 is acted upon in steps 191 and 195 of FIG. 1C. In step 191, it is determined whether the multi-GNSS navigation solution has met a certain minimum threshold condition, which may be, for example, whether it has attained a certain level of accuracy. The purpose of step 191 is to determine whether GNSS calculations should continue being made by only the selected subset $GNSS_s$, or whether one or more of the presently unselected/unused GNSS systems should be added to the GNSS calculations to achieve, e.g., greater accuracy. This analysis may be performed independently from the rest of the system (using an independent criteria), or may be provided by an application that is currently using the GNSS navigation solution(s) and requires a specific level of accuracy. As is well-known to one of ordinary skill in the art, there are a number of metrics for accuracy, the combination of which is sometimes referred to as Estimated Position Error (EPE) for a particular GNSS receiver and/or navigational/positional application.

If the minimum threshold is not met in step 191, the method loops back and turns on one or more of the unselected, thus, turned-off, signal separators 140X in step 175 (i.e., selects one or more GNSS constellations previously unselected in step 170, resulting in its/their signal separator(s) 140X being turned off in step 173). Obviously, if all of the possible GNSS constellations are being used (i.e., all signal separators 140A, . . . , Z are already turned on), step 175 is skipped. In one embodiment, step 175 only turns on one GNSS constellation at a time. For example, if only the GPS signals are being separated out and processed (i.e., if GPS is the only GNSS presently selected), and the minimum threshold is not met in step 191, only one GNSS constellation, for example, the Galileo constellation, is turned on in step 175 for additional processing and calculation. If, at some future point, the minimum threshold is again not met in step 191 using both the GPS and Galileo constellations, another GNSS constellation, for example, GLONASS, is turned on when the method returns to step 175. In such an embodiment, the list of GNSS constellations to turn on may be predetermined, determined by the GNSS receiver (based, for example, on received signals), and/or determined by the system the GNSS receiver is in (for example, a ground station may determine the preferred order based on current conditions and transmit the list to all collocated GNSS receivers). In other contemplated embodiments, the GNSS receiver and/or system may take a number of factors into account when performing step 175, including, for example, the present power situation of the GNSS receiver (in an embodiment where the GNSS receiver is portable and battery-operated, such as a mobile terminal). Once the one or more GNSS constellations are turned on in step 175, the method returns to step 180 and 185, to separate out and process the presently-operational GNSS signals to again calculate a multi-GNSS solution.

If the minimum threshold is met in step 191, it is determined in step 193 whether the multi-GNSS navigation solution has met and/or exceeds a certain maximum threshold condition, which may be, for example, whether it has attained a level of accuracy beyond what is presently needed. The purpose of step 191 is to determine whether GNSS calculations should continue being made by all of the selected subset $GNSS_s$, or whether one or more of the presently selected GNSS signal separators should be turned off to, e.g., save power and/or reduce computing resource usage. The maximum threshold condition is not limited to being a condition of the multi-GNSS navigation solution and may instead be, e.g., a percentage of overall power being presently consumed by the GNSS components.

If the maximum threshold is not met in step 193, the method loops back to step 180 to separate out the GNSS signals of the selected subset $GNSS_s$ and calculate a new multi-GNSS navigation solution. This embodiment assumes that the system is presently set to continually generate GNSS navigation solutions; however, this is not the case in other embodiments. For example, the entire GNSS receive chain could be turned off in other embodiments to save power until a new multi-GNSS solution is needed, thus effectively ending this iteration of the method indefinitely. In some embodiments, the loop may be made at predetermined intervals to save power (for example, every 1 ms). In other embodiments, the method may, after a certain number of iterations, return to step 170 (rather than step 180) to allow for the re-selection of a subset $GNSS_s$. In embodiments implemented in a mobile terminal, the starting selected subset $GNSS_s$ is preset at the factory (e.g., an initial selection of one GNSS system, such as GPS), and then the method would consist primarily of turning on and off the various other GNSS signal separation modules 140A, . . . , 140Z, as required or preferred by the mobile terminal in the field— meaning returning to step 170 is effectively a reset of the method by the mobile terminal according to such embodiments.

If the maximum threshold is met in step 193, the method loops back to turn off, or "unselect," one or more of the presently selected and thus turned-on signal separators 140X in step 177 (i.e., subtracts one or more GNSS constellations presently in subset $GNSS_s$, resulting in its/their signal separator(s) 140X being turned off in step 173). Obviously, if only one GNSS constellation is being used (i.e., only one signal separators 140X is presently turned on), step 177 is skipped. In one embodiment, step 177 only turns off one GNSS constellation at a time. For example, if the GPS, Galileo, and GLONASS signals are being separated out and processed (i.e., $GNSS_s$=GPS, Galileo, GLONASS), and the maximum threshold is met in step 193, only one GNSS constellation, for example, the GLONASS constellation, is unselected in step 177. If, at some future point, the maximum threshold is again met in step 193, another GNSS constellation, for example, Galileo, is turned off when the method returns to step 177. In such an embodiment, the list of GNSS constellations to be unselected, i.e., turned off, may be predetermined, determined by the GNSS receiver (based, for example, on received signals), and/or determined by the system the GNSS receiver is in (for example, a ground station may determine the preferred order based on current conditions and transmit the list to all collocated GNSS receivers). In other contemplated embodiments, the GNSS receiver and/or system may take a number of factors into account when performing step 177, including, for example, the present power situation of the GNSS receiver (in an embodiment where the GNSS receiver is portable and battery-operated, such as a mobile terminal). Once the one or more GNSS constellations are unselected in step 177, the method returns to step 173, to turn off the signal separators of the unselected GNSSs, and then process the presently-operational GNSS signals to again calculate a multi-GNSS solution.

Simultaneously and/or separately from steps 191 and 193, the multi-GNSS navigation solution from step 185 is output to the system in step 195. In most embodiments, this will mean providing the multi-GNSS navigation solution to an application currently using GNSS navigational/positional information. That application may reject the multi-GNSS navigation solution (as, for example, having insufficient accuracy), and that rejection may be used as part of the analysis in steps 191 and 193, as discussed above. After step 195, a number of things may happen in the system as a whole, depending on the specific embodiment—the possible variations being well-known to, and/or implementable by, one of ordinary skill in the art—as indicated by the dotted line coming out of step 195.

Like FIG. 1A, the methods shown in FIGS. 1B and 1C should be understood as conceptual frameworks, leaving out details extraneous to the explication of the present invention. In some embodiments, one or more of the steps may be performed substantially simultaneously (especially in an embodiment where one or more steps are part of a constantly repeating loop). One or more steps of the methods shown in FIGS. 1B and 1C may be merged together and/or a single step may be further divided into sub-steps. The specifics of how the one or more steps are merged, separated, and/or otherwise implemented (whether in hardware, software, or a combination of hardware and software) depends on a number of factors, as is well-known to one of ordinary skill in the art. This will be demonstrated by example in reference to the specific embodiment discussed below in reference to in FIGS. 4A, 4B, and 4C.

Figure 4A:
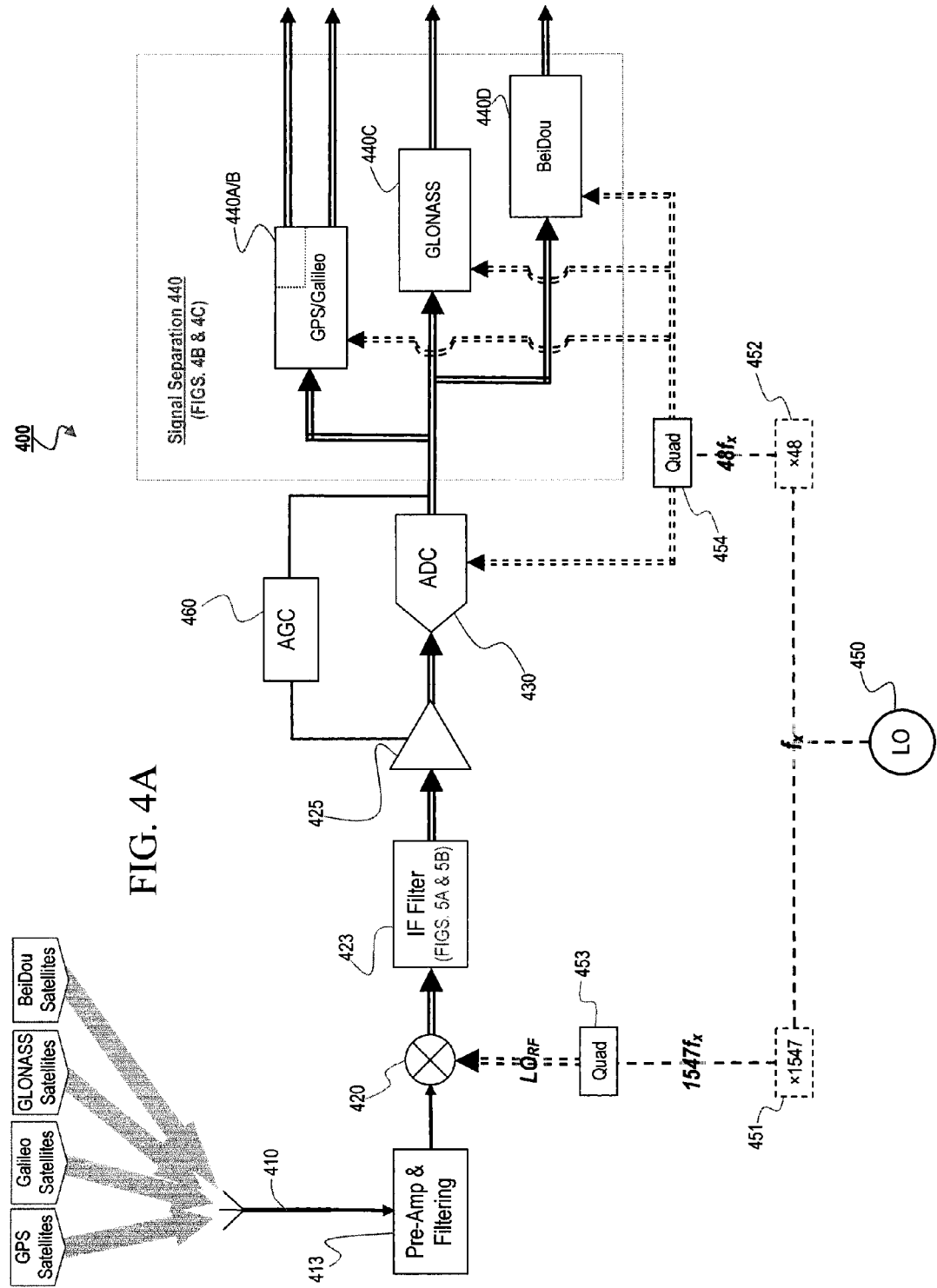
FIG. 4A illustrates a receiver chain for a GNSS system which is receiving and processing signals from the GPS/Gal/GLO/Bei constellations, according to an embodiment of the present invention.

FIG. 4A illustrates a receiver chain for a GNSS system which is capable of receiving and processing signals from the GPS/Gal/GLO/Bei constellations, according to an embodiment of the present invention. Antenna 410 is receiving signals from satellites in the GPS, Galileo, GLONASS, and BeiDou systems, the characteristics of which have been discussed above in reference to FIGS. 1A, 2A, and 2B. The received GPS/Gal/GLO/Bei signals are input into Pre-Amplification & Filtering 413. The pre-amplification and (initial) filtering processes are well-known to one of ordinary skill in the art of radio reception, and involves, in the case of GNSS signals, boosting the signals, which have been received from satellites about 20,000 kilometers away—making them loud enough to be heard, so to speak. Also, a rough filtration process would most likely ensue, to isolate the desired GNSS signals from the rest of the spectrum. The many means and variations that are possible when performing pre-amplification and filtering, as well as the stages and steps which may occur in the reception chain before, during, and after pre-amplification and filtering, are well-known to one of ordinary skill in the art and do not need further explanation here.

Figure 4B:
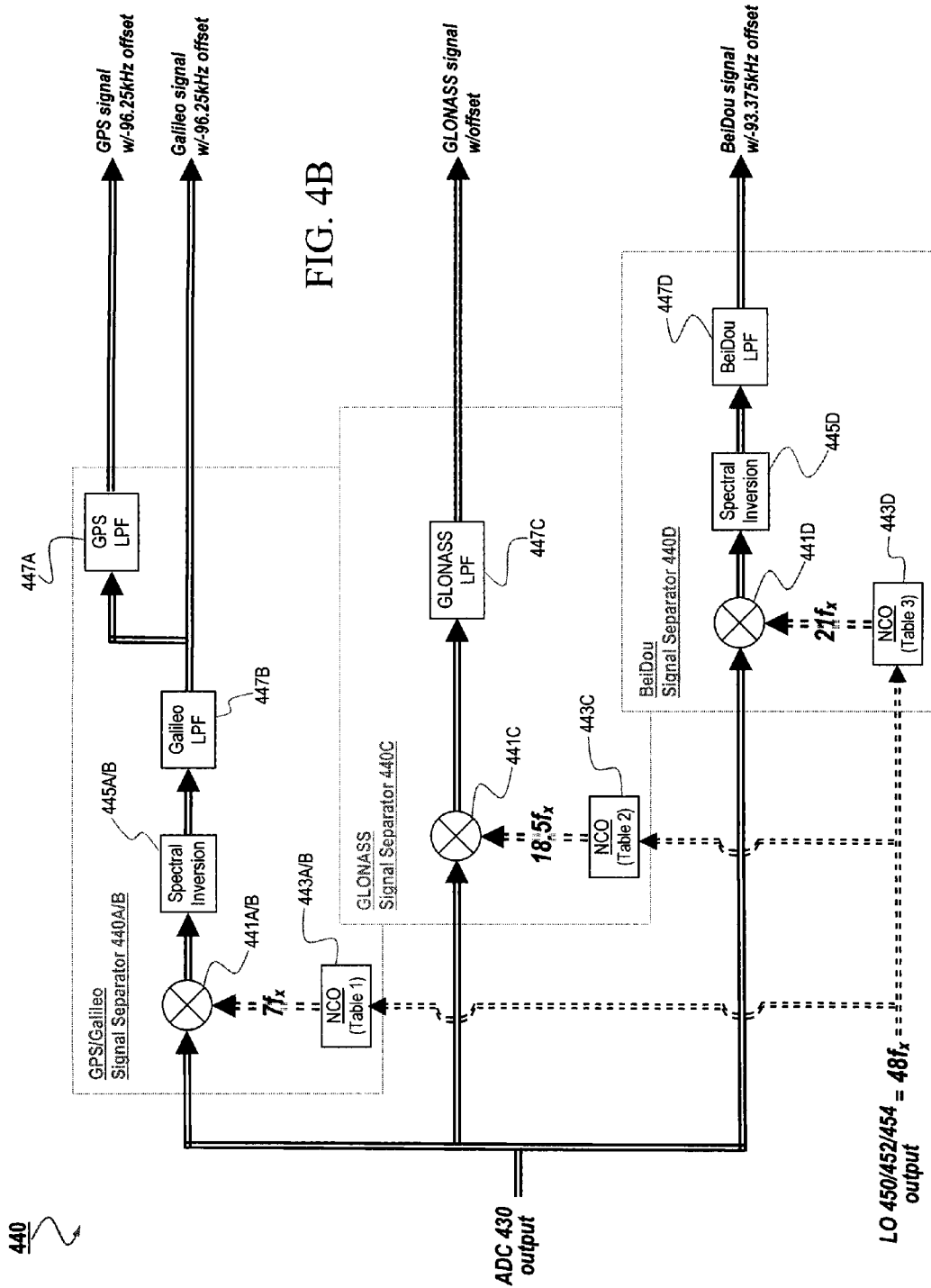
FIG. 4B illustrates the components of Signal Separation module 440 in FIG. 4A, according to an embodiment of the present invention.

After pre-amplification and initial filtering, the received GPS/Gal/GLO/Bei GNSS signals are input into complex mixer 420. Complex mixer 420 mixes the received GPS/Gal/GLO/Bei GNSS signals with complex $LO_{RF}$, as was discussed above in reference to FIGS. 1A and 3A-3C, resulting in a complex, and intermediate frequency (IF), signal. As shown in FIG. 4A, the complex $LO_{RF}$ signal originates at local oscillator (LO) 450, which generates timing signals for the system. All timing signals in FIGS. 4A and 4B are indicated by dotted lines. LO 450 generates a certain frequency ($f_x$) reference signal, which is used as the basis for other timing signals. As is well-known to those of ordinary skill in the art, the frequency of the actual output of the LO may be too high, and thus require reduction by means of a divider, to obtain the desired $f_x$ frequency reference signal. Moreover, in order to create the $LO_{RF}$ signal, which would typically be many times greater than the local oscillator or reference frequencies, the timing signal at frequency $f_x$ is in effect multiplied to the required frequency. The techniques for doing so are well-known to those of ordinary skill in the art, and include, for example, a phase-locked loop (PLL), among other methods. Also well-known to those of ordinary skill in the art, although a "local oscillator" is commonly referred to, the generation of the LO signal in actual practice is typically performed by a plurality of components, and may include the input of external timing signals for, e.g., tracking and other purposes.

In the embodiment of FIG. 4A, $f_x=1.0230625$ MHz, which is multiplied by multiplier 451 by 1547, resulting in $1547f_x=1582.6776875$ MHz. This signal is not yet complex, however, and needs to have a quadrature (Q) component created, by multiplying the signal by a 90° phase shift, which is done by module 453. Thus, the output of module 453, which is input to complex mixer 420, is the $LO_{RF}$ signal, with I and Q components and a frequency of $1547f_x=1582.6776875$ MHz. As is well-known to one of ordinary skill in the art, this is only one of the many ways a $1547f_x$ complex signal could be generated from an LO $f_x$ signal.

Figure 5A:
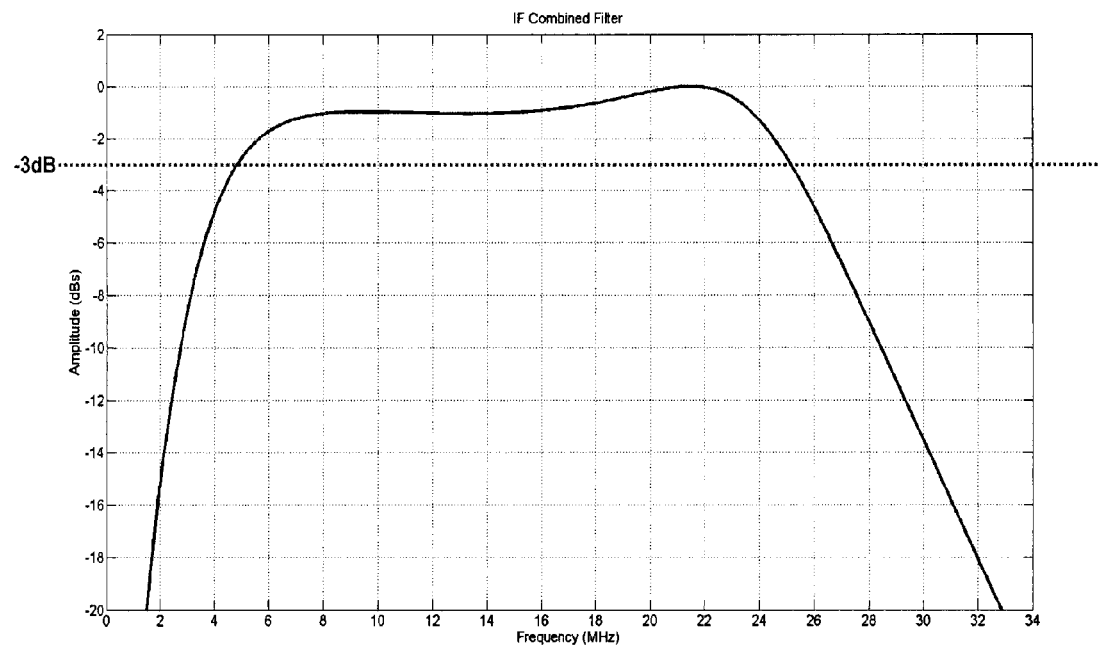
FIG. 5A is the frequency response of IF Filter 423 in FIG. 4A, according to an embodiment of the present invention.
Figure 5B:
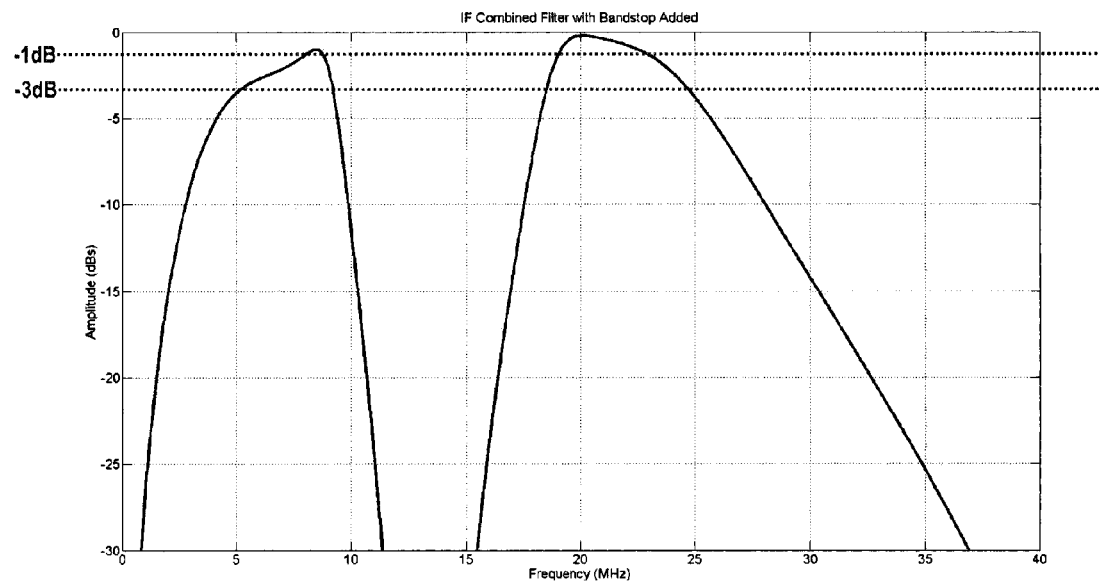
FIG. 5B is the frequency response of IF Filter 423 in FIG. 4A with an optional bandpass filter added, according to an embodiment of the present invention.

The output of complex mixer 420, i.e., the mixture of the complex $LO_{RF}$ signal and the received, amplified, and filtered GPS/Gal/GLO/Bei GNSS signals, is input to IF Filter 423. The purpose of IF Filter 423, which is a bandpass filter, is to narrow down the incoming signal for further processing (especially for the analog-to-digital conversion process), and, as is well-known to one of ordinary skill in the art, may be composed of multiple component filters in a chain. In the embodiment of FIG. 4A, the IF Filter 423 has the frequency response shown in FIG. 5A. The frequency response in FIG. 5A is the result of a high pass two-zero Butterworth filter with corner frequency 5.2 MHz. FIG. 5B shows the frequency response when a bandstop filter, i.e., a $3^{rd}$ order Chebyshev filter with corner frequency 23.7 MHz and a 1 dB stop band from 9 MHz to 19 MHz, is added to the filter whose frequency response is shown in FIG. 5A. This is beneficial because, as can be seen, the filter with the frequency response shown in FIG. 5B effectively isolates the GPS/Gal/GLO/Bei signals output from complex mixer 420, as shown in FIG. 3C. Eliminating all signals outside the GPS/Gal/GLO/Bei signal area is desirable before the analog-to-digital conversion process to eliminate any large interferers before conversion, because there is no way to eliminate such interference after conversion, resulting in $C/N_O$ (the ratio of carrier to noise spectral density) loss which can never be recovered.

Returning to FIG. 4A, the signals output by IF Filter 423 are next input to variable gain amplifier (VGA) 425 for further amplification before the analog-to-digital conversion process. VGA 425 is at least partially controlled by Automatic Gain Control (AGC) 460, which continually monitors signals along the receive chain in order to maintain a consistent level of amplitude across the system. The amplified output of VGA 425 is input to Analog-to-Digital Converter (ADC) 430, whose purpose has been discussed above in reference to FIG. 1A.

In FIG. 4A, the sampling rate ($f_s$) of ADC 430 is $f_s=48f_x=49.107$ MHz, where, as with the $LO_{RF}$ signal, the timing signal for sampling originates from a reference frequency ($f_x$) signal with is multiplied by 48 by multiplier 452. Sampling is the fundamental process by which analog signals are converted to digital signals, and the Nyquist sampling rate, which is twice the highest frequency component of the analog signal which is to be sampled, is the minimum sampling rate for an ADC such as 430. Thus, for a sampling rate of 49.107 MHz, the signal bandwidth captured is roughly 24.5 MHz, which is more than enough to fit the GPS/Gal/GLO/Bei bandwidth as shown in FIG. 3C. As known to those of ordinary skill in the art, the ADC sampling rate should always be higher than the minimum, at least, in this particular case, to allow enough frequency space for practically implementable roll-off IF filters, such as the bandstop filter which has the frequency response shown in FIG. 5B.

In the embodiment shown in FIG. 4A, the complex digital signals output by ADC 430, having been sampled at 49.107 MHz, are input to Signal Separation module 440, comprising the GPS/Galileo signal separator 440A/B, GLONASS signal separator 440C, and Beidou signal separator 440D. Each of the individual modules receives the same digital input from ADC 430. As mentioned above, the GPS and Galileo signal separators have been partially combined into separator 440A/B because the transmitted GPS and Galileo signals share the same frequency band. Thus, unlike the other signal separators, GPS/Galileo signal separator 440A/B has two outputs, one for GPS and one for Galileo. A portion of GPS/Galileo signal separator 440A/B in FIG. 4A has been separated by a dotted line, thereby indicating the additional component(s) in GPS/Galileo signal separator 440A/B not in the GLONASS and BeiDou signal separators 440C and 440D. As with FIG. 1A, GPS/Galileo signal separator 440A/B, GLONASS signal separator 440C, and BeiDou signal separator 440D separate out the GPS, Galileo, GLONASS, and BeiDou signals, respectively, and output the signals to be used for navigational processing and calculation.

FIG. 4B illustrates the details of the components within GPS/Galileo signal separator 440A/B, GLONASS signal separator 440C, and BeiDou signal separator 440D in FIG. 4A, according to an embodiment of the present invention. In general, each signal separator 440 includes a complex mixer 441 which mixes down the ADC 430 output (having all GNSS signals in digital form) to the specific GNSS carrier frequency (ultimately based on the original GNSS satellite center transmission frequency) and a low-pass filter (LPF) 447 which matches the specific GNSS spreading code-generated bandwidth. A numerically-controlled oscillator (NCO) 443, whose timing signal input ultimately derives from LO 450, provides the appropriate frequency mixing signal for complex mixer 441.

More specifically, in GPS/Galileo signal separator 440A/B, NCO 443A/B receives timing signal input $48f_x$ (which ultimately derives from LO 450) and outputs a complex digital signal of frequency $7f_x$ (the details of the NCO are discussed further below in reference to Table 1). $7f_x$=7.1614375 MHz=roughly the central frequency of the GPS/Galileo signals in the IF domain, i.e., the center of GPS/Galileo IF signals 220/225 in FIGS. 3B and 3C, generated by mixing the GPS/Galileo RF signals with complex $LO_{RF}$ in mixer 420. This timing signal of frequency $7f_x$ output by NCO 443A/B is fed to complex mixer 441A/B, where it is mixed with the ADC 430 output (having all GNSS signals in digital form). The output of complex mixer 441A/B, having effectively been "down-mixed" to the GPS/Galileo (IF) carrier frequency, passes through Spectral Inversion unit 445A/B, which "reverses" the GPS/Galileo IF signals 220/225 from the "negative side" of the spectrum, as shown in FIG. 3A. In practice, this may be done by simply inverting the sign of the Q component of the digital signal output by NCO 443A/B.

Once inverted by Spectral Inversion unit 445A/B, the complex digital signal is filtered by Galileo LPF 447B, which matches the Galileo spreading code-generated bandwidth of 4.092 MHz (null to null frequency spectrum after sampling). Thus, the output of Galileo LPF 447B is the Galileo signal in complex digital form, plus a remaining carrier frequency offset (i.e., −96.25 kHz and the Doppler and oscillator offset terms), which will be removed to make the Galileo signal ready for further processing by GNSS system 400. To generate the corresponding GPS output, the output of Galileo LPF 447B is input to GPS LPF 447A, which matches the GPS spreading code generated bandwidth, which is only 2.046 MHz (null to null frequency spectrum after sampling). Thus, Galileo LPF 447B is placed before GPS LPF 447A in the signal path because the output of Galileo LPF 447B will still have the GPS signal within it. The output of GPS LPF 447A is the GPS signal in complex digital form, plus a remaining carrier frequency offset (i.e., −96.25 kHz=transmit frequency−$LO_{RF}$+NCO output frequency=1575.42 MHz−1582.6776875 MHz+7×1.0230625 MHz=−0.09625 MHz), which will be removed to make the GPS signal ready for further processing by GNSS system 400. As is well-known to one of ordinary skill in the art, there are other frequency offsets which need to be removed, such as the Doppler offset and other possible oscillator offsets depending on the embodiment; however, such well-known features/problems common to GNSS systems will not be discussed in order to avoid obscuring the invention in unnecessary detail.

In each signal separator 440, the numerically controller oscillator NCO 443 is a digital signal generator which creates a synchronous (i.e. clocked) discrete time, discrete valued representation of a waveform. An NCO generally comprises two parts: a phase accumulator (PA) which adds a frequency control value at each clock sample, and a phase-to-amplifier converter (PAC) which uses the PA frequency control value to generate the corresponding amplitude sample. In this embodiment, the PAC uses a look-up table (LUT) to match the amplitude value to the phase value output by the PA. In other embodiments, the PAC may use interpolation as well as the LUT to provide better accuracy and reduce phase error noise. In yet further embodiments, other methods may be used besides LUT's, including using a mathematical algorithm, like a power series, particularly in a software NCO.

In GPS/Galileo signal separator 440A/B shown in FIG. 4B, according to an embodiment of the present invention, NCO 443A/B uses a LUT, with values as shown in Table 1 below. In general, the NCO 443's LUT must translate the clocking rate into the desired complex oscillator frequency (complex because it has I and Q components). To put it another way, at each tick of the clock, the table provides the point in the cycle of the two waveforms I and Q having the desired frequency. For GPS/Galileo NCO 441A/B, the LUT provides I (cos) and Q (sin) values for every tick of the $48f_x$ clock which correspond to a complex digital signal of frequency $7f_x$.

TABLE 1

GPS/Galileo NCO 441A/B Lookup Table

| NCO phase of 48 $f_x$ clock | cos | sin |
|---|---|---|
| 0 | 15 | 0 |
| 1 | 9 | 12 |
| 2 | −4 | 14 |
| 3 | −14 | 6 |
| 4 | −13 | −7 |
| 5 | −2 | −15 |
| 6 | 11 | −11 |
| 7 | 15 | 2 |
| 8 | 8 | 13 |
| 9 | −6 | 14 |
| 10 | −14 | 4 |
| 11 | −12 | −9 |
| 12 | 0 | −15 |
| 13 | 12 | −9 |
| 14 | 14 | 4 |
| 15 | 6 | 14 |
| 16 | −7 | 13 |
| 17 | −15 | 2 |
| 18 | −11 | −11 |
| 19 | 2 | −15 |
| 20 | 13 | −8 |
| 21 | 14 | 6 |
| 22 | 4 | 14 |
| 23 | −9 | 12 |
| 24 | −15 | 0 |
| 25 | −9 | −12 |
| 26 | 4 | −14 |
| 27 | 14 | −6 |
| 28 | 13 | 7 |
| 29 | 2 | 15 |
| 30 | −11 | 11 |
| 31 | −15 | −2 |
| 32 | −8 | −13 |
| 33 | 6 | −14 |
| 34 | 14 | −4 |
| 35 | 12 | 9 |
| 36 | 0 | 15 |
| 37 | −12 | 9 |
| 38 | −14 | −4 |
| 39 | −6 | −14 |
| 40 | 7 | −13 |
| 41 | 15 | −2 |
| 42 | 11 | 11 |
| 43 | −2 | 15 |
| 44 | −13 | 8 |
| 45 | −14 | −6 |
| 46 | −4 | −14 |
| 47 | 9 | −12 |

Figure 4C:
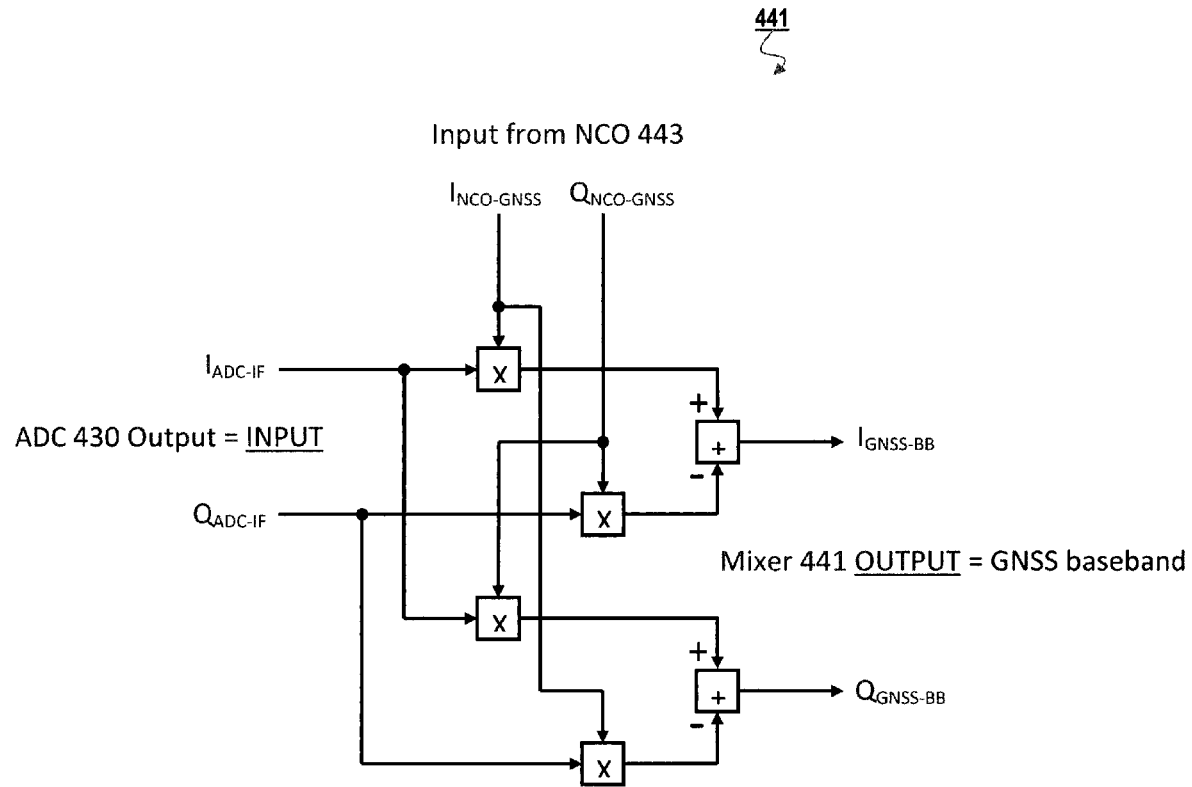
FIG. 4C illustrates the complex mixer 441 used by the signal separators 440A/B-440D in FIG. 4B, according to an embodiment of the present invention.

The values for sin and cos, as shown in Table 1 above, are the output of NCO 443A/B, which is the input to be mixed with the ADC 430 output in complex mixer 441A/B. In general (i.e., for all signal separators), complex mixer 441 has the components, input, and output as shown in FIG. 4C. The ADC 430 digital output, containing all of the GNSS signals, is input on the left-hand side, having an in-phase component ($I_{ADC-IF}$) and a quadrature component ($Q_{ADC-IF}$). NCO 443 output, having the in-phase component ($I_{NCO-GNSS}$=cos in the Tables herein) and a quadrature component ($Q_{NCO-GNSS}$=sin in the Tables herein), is input at the top of FIG. 4C. Once processed by the complex mixer components (which are well-known to one of ordinary skill in the art), those input signals become an output complex digital signal at the baseband for that specific GNSS, i.e., the digital signal having the in-phase component ($I_{GNSS-BB}$) and a quadrature component ($Q_{GNSS-BB}$), shown as output on the right side of FIG. 4C.

Continuing with GLONASS signal separator 440C of FIG. 4B, NCO 443C receives timing signal input 48$f_x$ (which ultimately derives from LO 450) and outputs a complex digital signal of frequency 18.5$f_x$=18.92665625 MHz=the central transmit frequency of the GLONASS signals in the IF domain, i.e., the center of GLONASS IF signals 230B in FIG. 3B, generated by mixing the GLONASS RF signals with complex $LO_{RF}$ in mixer 420. This timing signal of frequency 18.5$f_x$ output by NCO 443C is fed to complex mixer 441C, where it is mixed with the ADC 430 output (having all GNSS signals in digital form). The output of complex mixer 441C, having effectively been "downmixed" to the GLONASS (IF) carrier frequency, is input directly into GLONASS LPF 447C, which matches the GLONASS spreading code-generated bandwidth of 1.022 MHz (null to null frequency spectrum after sampling). The GLONASS digital output of NCO 443C does not need the spectral inverting required for the GPS, Galileo, and BeiDou signals because GLONASS IF signals 230B are already on the "positive" side of the IF spectrum, as shown in FIG. 3A. The output of GLONASS LPF 447C is the GLONASS signal in complex digital form, ready for further processing by GNSS system 400. Like the GPS and/or Galileo signals, the GLONASS signal in complex digital form also has a remaining carrier frequency offset=transmit frequency−$LO_{RF}$+NCO output frequency; however, its exact amount and calculation depends on which of the 14 GLONASS channels is being transmitted. In any event, like the other GNSS outputs, the GLONASS offset which will be removed to make the GLONASS signal ready for further processing by GNSS system 400.

In GLONASS signal separator 440C shown in FIG. 4B, according to an embodiment of the present invention, NCO 443C uses a LUT, with values as shown in Table 2 below. The GLONASS NCO 443C's LUT must translate the 48$f_x$ clocking rate into the desired complex digital signal having frequency 18.5$f_x$. In order to generate an integer number of cycles, the GLONASS NCO 443C's LUT has I and Q values generated over 2 periods, and thus has twice as many values, i.e., 2×48$f_x$=96 values, where an 18.5$f_x$ signal becomes a 37$f_x$ signal over a 96$f_x$ period.

TABLE 2

GLONASS NCO 441C Lookup Table

| NCO phase of 48 $f_x$ clock | cos | sin |
|---|---|---|
| 0 | 31 | 0 |
| 1 | −23 | 20 |
| 2 | 4 | −31 |
| 3 | 17 | 26 |
| 4 | −30 | −8 |
| 5 | 28 | −14 |
| 6 | −12 | 29 |
| 7 | −10 | −29 |
| 8 | 27 | 15 |
| 9 | −30 | 6 |
| 10 | 19 | −25 |
| 11 | 2 | 31 |
| 12 | −22 | −22 |
| 13 | 31 | 2 |
| 14 | −25 | 19 |
| 15 | 6 | −30 |
| 16 | 16 | 27 |
| 17 | −29 | −10 |
| 18 | 29 | −12 |
| 19 | −14 | 28 |
| 20 | −8 | −30 |
| 21 | 26 | 17 |
| 22 | −31 | 4 |
| 23 | 20 | −23 |
| 24 | 0 | 31 |
| 25 | −20 | −23 |

TABLE 2-continued

GLONASS NCO 441C Lookup Table

| NCO phase of 48 $f_x$ clock | cos | sin |
|---|---|---|
| 26 | 31 | 4 |
| 27 | −26 | 17 |
| 28 | 8 | −30 |
| 29 | 14 | 28 |
| 30 | −29 | −12 |
| 31 | 29 | −10 |
| 32 | −15 | 27 |
| 33 | −6 | −30 |
| 34 | 25 | 19 |
| 35 | −31 | 2 |
| 36 | 22 | −22 |
| 37 | −2 | 31 |
| 38 | −19 | −25 |
| 39 | 30 | 6 |
| 40 | −27 | 16 |
| 41 | 10 | −29 |
| 42 | 12 | 29 |
| 43 | −28 | −14 |
| 44 | 30 | −8 |
| 45 | −17 | 26 |
| 46 | −4 | −31 |
| 47 | 0 | 31 |
| 48 | 23 | 20 |
| 49 | −31 | 0 |
| 50 | 23 | −20 |
| 51 | −4 | 31 |
| 52 | −17 | −26 |
| 53 | 30 | 8 |
| 54 | −28 | 14 |
| 55 | 12 | −29 |
| 56 | 10 | 29 |
| 57 | −27 | −16 |
| 58 | 30 | −6 |
| 59 | −19 | 25 |
| 60 | −2 | −31 |
| 61 | 22 | 22 |
| 62 | −31 | −2 |
| 63 | 25 | −19 |
| 64 | −6 | 30 |
| 65 | −16 | −27 |
| 66 | 29 | 10 |
| 67 | −29 | 12 |
| 68 | 14 | −28 |
| 69 | 8 | 30 |
| 70 | −26 | −17 |
| 71 | 31 | −4 |
| 48 | 23 | 20 |
| 49 | −31 | 0 |
| 50 | 23 | −20 |
| 51 | −4 | 31 |
| 52 | −17 | −26 |
| 53 | 30 | 8 |
| 54 | −28 | 14 |
| 55 | 12 | −29 |
| 56 | 10 | 29 |
| 57 | −27 | −16 |
| 58 | 30 | −6 |
| 59 | −19 | 25 |
| 60 | −2 | −31 |
| 61 | 22 | 22 |
| 62 | −31 | −2 |
| 63 | 25 | −19 |
| 64 | −6 | 30 |
| 65 | −16 | −27 |
| 66 | 29 | 10 |
| 67 | −29 | 12 |
| 68 | 14 | −28 |
| 69 | 8 | 30 |
| 70 | −26 | −17 |
| 71 | 31 | −4 |
| 72 | −20 | 23 |
| 73 | 0 | −31 |
| 74 | 20 | 23 |
| 75 | −31 | −4 |
| 76 | 26 | −17 |
| 77 | −8 | 30 |
| 78 | −14 | −28 |
| 79 | 29 | 12 |
| 80 | −29 | 10 |
| 81 | 15 | −27 |
| 82 | 6 | 30 |
| 83 | −25 | −19 |
| 84 | 31 | −2 |
| 85 | −22 | 22 |
| 86 | 2 | −31 |
| 87 | 19 | 25 |
| 88 | −30 | −6 |
| 89 | 27 | −15 |
| 90 | −10 | 29 |
| 91 | −12 | −29 |
| 92 | 28 | 14 |
| 93 | −30 | 8 |
| 94 | 17 | −26 |
| 95 | 4 | 31 |

Continuing with BeiDou signal separator 440D of FIG. 4B, the BeiDou NCO 443D receives timing signal input $48f_x$ (which ultimately derives from LO 450) and outputs a complex digital signal of frequency $21f_x$=21.4843125 MHz=roughly the central transmit frequency of the BeiDou signals in the IF domain, i.e., the center of BeiDou IF signals 210 shown in FIGS. 3B and 3C, generated by mixing the BeiDou RF signals with complex $LO_{RF}$ in mixer 420. This timing signal of frequency $21f_x$ output by NCO 443D is fed to complex mixer 441D, where it is mixed with the ADC 430 output (having all GNSS signals in digital form). The output of complex mixer 441D, having effectively been "down-mixed" to the BeiDou (IF) carrier frequency, passes through Spectral Inversion unit 445D, which "reverses" the BeiDou IF signals 210 from the "negative side" of the spectrum, as shown in FIG. 3A. In practice, this may be done by simply inverting the sign of the Q component of the digital signal output by NCO 443D. Once inverted by Spectral Inversion unit 445D, the complex digital signal is filtered by BeiDou LPF 447D, which matches the BeiDou spreading code-generated bandwidth of 1.022 MHz (null to null frequency spectrum after sampling). Thus, the output of BeiDou LPF 447D is the BeiDou signal in complex digital form, plus a remaining carrier frequency offset (i.e., −95.375 kHz=transmit frequency−$LO_{RF}$+NCO output frequency=1561.098 MHz−1582.6776875 MHz+21×1.0230625 MHz=−0.095375 MHz), which will be removed to make the BeiDou signal ready for further processing by GNSS system 400.

In BeiDou signal separator 440D shown in FIG. 4B, according to an embodiment of the present invention, NCO 443D uses a LUT, with values as shown in Table 3 below.

TABLE 3

BeiDou NCO 441D Lookup Table

| NCO phase of 48 $f_x$ clock | cos | sin |
|---|---|---|
| 0 | 31 | 0 |
| 1 | −29 | 12 |
| 2 | 22 | −22 |
| 3 | −12 | 29 |
| 4 | 0 | −31 |

TABLE 3-continued

BeiDou NCO 441D Lookup Table

| NCO phase of 48 $f_x$ clock | cos | sin |
|---|---|---|
| 5 | 12 | 29 |
| 6 | −22 | −22 |
| 7 | 29 | 12 |
| 8 | −31 | 0 |
| 9 | 29 | −12 |
| 10 | −22 | 22 |
| 11 | 12 | −29 |
| 12 | 0 | 31 |
| 13 | −12 | −29 |
| 14 | 22 | 22 |
| 15 | −29 | −12 |
| 16 | 31 | 0 |
| 17 | −29 | 12 |
| 18 | 22 | −22 |
| 19 | −12 | 29 |
| 20 | 0 | −31 |
| 21 | 12 | 29 |
| 22 | −22 | −22 |
| 23 | 29 | 12 |
| 24 | −31 | 0 |
| 25 | 29 | −12 |
| 26 | −22 | 22 |
| 27 | 12 | −29 |
| 28 | 0 | 31 |
| 29 | −12 | −29 |
| 30 | 22 | 22 |
| 31 | −29 | −12 |
| 32 | 31 | 0 |
| 33 | −29 | 12 |
| 34 | 22 | −22 |
| 35 | −12 | 29 |
| 36 | 0 | −31 |
| 37 | 12 | 29 |
| 38 | −22 | −22 |
| 39 | 29 | 12 |
| 40 | −31 | 0 |
| 41 | 29 | −12 |
| 42 | −22 | 22 |
| 43 | 12 | −29 |
| 44 | 0 | 31 |
| 45 | −12 | −29 |
| 46 | 22 | 22 |
| 47 | −29 | −12 |

In other embodiments of the present invention, further digital filtering may be used to decimate the various GNSS signal streams in order to reduce, e.g., processing rate or memory requirements, later on.

Thus, as shown above, embodiments of the present invention provide a single RF/IF receive chain for signals from satellites of multiple GNSS constellations, where that receive chain also reduces the IF signal bandwidth to minimal values before the signals are subject to ADC sampling, which is also performed at a minimum rate. The embodiments of the present invention are also scalable—less or more GNSS signal separators may be in the system, and those individual modules may be turned on or off as desired. In general, the digital circuitry is capable of processing an input comprising all of the complex GNSS signals such that each of the GNSS system signals is optimally separated in terms of its own signal characteristics (including the L-band carrier transmit frequency and spreading code). Moreover, a bandpass/bandstop filter is described which, when added to the receive chain before ADC sampling, will remove interfering signals from the digital signal, thereby reducing the GNSS receiver's sensitivity to interfering signals.

While several embodiments have been described, it will be understood that various modifications can be made without departing from the scope of the present invention. Thus, it will be apparent to those of ordinary skill in the art that the invention is not limited to the embodiments described, but can encompass everything covered by the appended claims and their equivalents.

What is claimed is:

1. A method for a receiver in a satellite navigational system to receive signals of multiple satellites from a plurality of satellite system constellations, comprising:
   receiving a radiofrequency (RF) signal comprising transmissions from multiple satellites in the plurality of satellite system constellations;
   translating the RF signal comprising transmissions from the multiple satellites in the plurality of satellite system constellations to an analog intermediate frequency (IF) signal comprising transmissions from the multiple satellites in the plurality of satellite system constellations by mixing the RF signal with a local oscillator-derived signal $LO_{RF}$;
   sampling the IF signal at a sampling rate $f_s$ to convert the analog IF signal to a digital IF signal; and
   separating out, for each satellite system, signals of satellites of the satellite system from the digital IF signal by mixing the digital IF signal with a numerically-controlled oscillator (NCO) output signal $f_{NCO\text{-}GNSS}$, the NCO output signal $f_{NCO\text{-}GNSS}$ having a frequency corresponding to a center of a transmission frequency of the satellites in the satellite system after translation to the IF.

2. The method of claim 1, wherein each of $LO_{RF}$, $f_s$, and $f_{NCO\text{-}GNSS}$ is a multiple of a reference frequency $f_x$.

3. The method of claim 2, wherein the reference frequency $f_x$ is a divisor of a timing signal generated by a local oscillator in the receiver.

4. The method of claim 1, wherein $LO_{RF}$ is substantially in a center of all the transmission frequencies used by the plurality of satellite system constellations.

5. The method of claim 1, wherein, before sampling the IF signal, the method further comprises:
   bandpass filtering the IF signal, the bandpass being set above the highest frequency transmission at IF of the plurality of satellite system constellations and below the lowest frequency transmission at IF of the plurality of satellite system constellations.

6. The method of claim 5, wherein, before sampling the IF signal, the method further comprises:
   bandstop filtering the IF signal, the bandstop being set between frequencies of transmission at IF of the plurality of satellite system constellations.

7. The method of claim 1, wherein separating out, for each satellite system, signals of satellites of the satellite system from the digital IF signal further comprises:
   lowpass filtering the output of mixing the digital IF signal with NCO output signal $f_{NCO\text{-}GNSS}$, a bandwidth of the lowpass being a bandwidth of signals transmitted by the satellites of the satellite system.

8. The method of claim 1, further comprising:
   selecting one or more satellite systems from the plurality of satellite systems; and
   not performing the step of separating out signals for any of the plurality of satellite systems not selected in the selecting step.

9. The method of claim 8, further comprising:
   when a navigational solution calculated by processing the separated out signals of selected satellite systems does not meet a threshold of accuracy, selecting one or more of the previously-unselected satellite systems such that the step of separating out signals is now also performed for the one or more now-selected, previously-unselected satellite systems.

10. A reception chain in a satellite navigational system receiver, comprising:
a receiver configured to receive a radiofrequency (RF) signal comprising transmissions from multiple satellites in a plurality of satellite system constellations;
a first complex mixer configured to mix the received RF signal with a local oscillator-derived signal $LO_{RF}$, generating an output of an analog intermediate frequency (IF) signal comprising the transmissions from the multiple satellites in the plurality of satellite system constellations;
an analog-to-digital convertor (ADC) configured to sample the IF signal at a sampling rate $f_s$ to convert the analog IF signal to a digital IF signal; and
a second complex mixer configured to mix the digital IF signal with a numerically-controlled oscillator (NCO) output signal $f_{NCO\text{-}GNSS}$, the NCO output signal $f_{NCO\text{-}GNSS}$ having a frequency corresponding to a center of a transmission frequency at IF of satellites in a target satellite system of the plurality of satellite systems, thereby separating out signals of satellites of the target satellite system from the digital IF signal.

11. The reception chain of claim 10, wherein the second complex mixer configured to mix the digital IF signal with a numerically-controlled oscillator (NCO) output signal $f_{NCO\text{-}GNSS}$ is one of a plurality of complex mixers, and wherein:
each of the plurality of complex mixers is configured to mix the digital IF signal with a numerically-controlled oscillator (NCO) output signal $f_{NCO\text{-}GNSSi}$, the NCO output signal $f_{NCO\text{-}GNSSi}$ having a frequency corresponding to a center of a transmission frequency at IF of satellites in satellite system $GNSS_i$ of the plurality of satellite systems $GNSS_1\text{-}GNSS_n$, whereby the plurality of complex mixers separate out signals of satellites in each of the plurality of satellite systems $GNSS_1\text{-}GNSS_n$ from the digital IF signal.

12. The reception chain of claim 11, further comprising:
a bandpass filter configured to filter the IF signal before being input to the ADC, the bandpass being set above the highest frequency transmission at IF of the plurality of satellite system constellations and below the lowest frequency transmission at IF of the plurality of satellite system constellations.

13. The reception chain of claim 11, further comprising:
a bandstop filter configured to filter the IF signal before being input to the ADC, the bandstop being set between frequencies of transmission at IF of the plurality of satellite system constellations.

14. The reception chain of claim 11, further comprising:
a plurality of lowpass filters comprising at least one lowpass filter for each of the plurality of complex mixers configured to mix the digital IF signal with NCO output signal $f_{NCO\text{-}GNSSi}$, a bandwidth of the at least one lowpass filter being a bandwidth of signals transmitted by satellites of the satellite system $GNSS_i$.

15. The reception chain of claim 11, wherein the NCO which outputs signal $f_{NCO\text{-}GNSSi}$, uses a look-up table.

16. The reception chain of claim 15, wherein a reference frequency $f_x$ is a divisor of a timing signal generated by a local oscillator in the receiver, and each of $LO_{RF}$, $f_s$, and $f_{NCO\text{-}GNSS}$ are multiples of $f_x$.

17. The reception chain of claim 16, wherein $f_x=1.0230625$ MHz, $LO_{RF}=1547f_x=1582.6776875$ MHz, and $f_s=48f_x=49.107$ MHz.

18. The reception chain of claim 17, wherein the $GNSS_i$ is at least one of the Global Positioning System (GPS) and the Galileo system, an input clock signal for $NCO_{GPS/Galileo}$ is $48f_x=49.107$ MHz, and the look-up table for outputting signal $f_{NCO\text{-}GPS/Galileo}$ comprises:

| NCO phase of 48 $f_x$ clock | cos | sin |
|---|---|---|
| 0 | 15 | 0 |
| 1 | 9 | 12 |
| 2 | -4 | 14 |
| 3 | -14 | 6 |
| 4 | -13 | -7 |
| 5 | -2 | -15 |
| 6 | 11 | -11 |
| 7 | 15 | 2 |
| 8 | 8 | 13 |
| 9 | -6 | 14 |
| 10 | -14 | 4 |
| 11 | -12 | -9 |
| 12 | 0 | -15 |
| 13 | 12 | -9 |
| 14 | 14 | 4 |
| 15 | 6 | 14 |
| 16 | -7 | 13 |
| 17 | -15 | 2 |
| 18 | -11 | -11 |
| 19 | 2 | -15 |
| 20 | 13 | -8 |
| 21 | 14 | 6 |
| 22 | 4 | 14 |
| 23 | -9 | 12 |
| 24 | -15 | 0 |
| 25 | -9 | -12 |
| 26 | 4 | -14 |
| 27 | 14 | -6 |
| 28 | 13 | 7 |
| 29 | 2 | 15 |
| 30 | -11 | 11 |
| 31 | -15 | -2 |
| 32 | -8 | -13 |
| 33 | 6 | -14 |
| 34 | 14 | -4 |
| 35 | 12 | 9 |
| 36 | 0 | 15 |
| 37 | -12 | 9 |
| 38 | -14 | -4 |
| 39 | -6 | -14 |
| 40 | 7 | -13 |
| 41 | 15 | -2 |
| 42 | 11 | 11 |
| 43 | -2 | 15 |
| 44 | -13 | 8 |
| 45 | -14 | -6 |
| 46 | -4 | -14 |
| 47 | 9 | -12. |

19. The reception chain of claim 17, wherein the $GNSS_i$ is the GLObalnaya NAvigatsionnaya Sputnikovaya Sistema (GLONASS), an input clock signal for $NCO_{GLONASS}$ is $48f_x=49.107$ MHz, and the look-up table for outputting signal $f_{NCO\text{-}GLONASS}$ comprises:

| NCO phase of 48 $f_x$ clock | cos | sin |
|---|---|---|
| 0 | 31 | 0 |
| 1 | -23 | 20 |
| 2 | 4 | -31 |
| 3 | 17 | 26 |
| 4 | -30 | -8 |

| NCO phase of 48 $f_x$ clock | cos | sin |
| --- | --- | --- |
| 5 | 28 | −14 |
| 6 | −12 | 29 |
| 7 | −10 | −29 |
| 8 | 27 | 15 |
| 9 | −30 | 6 |
| 10 | 19 | −25 |
| 11 | 2 | 31 |
| 12 | −22 | −22 |
| 13 | 31 | 2 |
| 14 | −25 | 19 |
| 15 | 6 | −30 |
| 16 | 16 | 27 |
| 17 | −29 | −10 |
| 18 | 29 | −12 |
| 19 | −14 | 28 |
| 20 | −8 | −30 |
| 21 | 26 | 17 |
| 22 | −31 | 4 |
| 23 | 20 | −23 |
| 24 | 0 | 31 |
| 25 | −20 | −23 |
| 26 | 31 | 4 |
| 27 | −26 | 17 |
| 28 | 8 | −30 |
| 29 | 14 | 28 |
| 30 | −29 | −12 |
| 31 | 29 | −10 |
| 32 | −15 | 27 |
| 33 | −6 | −30 |
| 34 | 25 | 19 |
| 35 | −31 | 2 |
| 36 | 22 | −22 |
| 37 | −23 | 1 |
| 38 | −19 | −25 |
| 39 | 30 | 6 |
| 40 | −27 | 16 |
| 41 | 10 | −29 |
| 42 | 12 | 29 |
| 43 | −28 | −14 |
| 44 | 30 | −8 |
| 45 | −17 | 26 |
| 46 | −4 | −31 |
| 47 | 0 | 31 |
| 48 | 23 | 20 |
| 49 | −31 | 0 |
| 50 | 23 | −20 |
| 51 | −4 | 31 |
| 52 | −17 | −26 |
| 53 | 30 | 8 |
| 54 | −28 | 14 |
| 55 | 12 | −29 |
| 56 | 10 | 29 |
| 57 | −27 | −16 |
| 58 | 30 | −6 |
| 59 | −19 | 25 |
| 60 | −2 | −31 |
| 61 | 22 | 22 |
| 62 | −31 | −2 |
| 63 | 25 | −19 |
| 64 | −6 | 30 |
| 65 | −16 | −27 |
| 66 | 29 | 10 |
| 67 | −29 | 12 |
| 68 | 14 | −28 |
| 69 | 8 | 30 |
| 70 | −26 | −17 |
| 71 | 31 | −4 |
| 48 | 23 | 20 |
| 49 | −31 | 0 |
| 50 | 23 | −20 |
| 51 | −4 | 31 |
| 52 | −17 | −26 |
| 53 | 30 | 8 |
| 54 | −28 | 14 |
| 55 | 12 | −29 |
| 56 | 10 | 29 |
| 57 | −27 | −16 |
| 58 | 30 | −6 |
| 59 | −19 | 25 |
| 60 | −2 | −31 |
| 61 | 22 | 22 |
| 62 | −31 | −2 |
| 63 | 25 | −19 |
| 64 | −6 | 30 |
| 65 | −16 | −27 |
| 66 | 29 | 10 |
| 67 | −29 | 12 |
| 68 | 14 | −28 |
| 69 | 8 | 30 |
| 70 | −26 | −17 |
| 71 | 31 | −4 |
| 72 | −20 | 23 |
| 73 | 0 | −31 |
| 74 | 20 | 23 |
| 75 | −31 | −4 |
| 76 | 26 | −17 |
| 77 | −8 | 30 |
| 78 | −14 | −28 |
| 79 | 29 | 12 |
| 80 | −29 | 10 |
| 81 | 15 | −27 |
| 82 | 6 | 30 |
| 83 | −25 | −19 |
| 84 | 31 | −2 |
| 85 | −22 | 22 |
| 86 | 2 | −31 |
| 87 | 19 | 25 |
| 88 | −30 | −6 |
| 89 | 27 | −15 |
| 90 | −10 | 29 |
| 91 | −12 | −29 |
| 92 | 28 | 14 |
| 93 | −30 | 8 |
| 94 | 17 | −26 |
| 95 | 4 | 31. |

20. The reception chain of claim 17, wherein the $GNSS_i$ is the BeiDou system, an input clock signal for $NCO_{BeiDou}$ is $48f_x = 49.107$ MHz, and the look-up table for outputting signal $f_{NCO\text{-}BeiDou}$ comprises:

| NCO phase of 48 $f_x$ clock | cos | sin |
| --- | --- | --- |
| 0 | 31 | 0 |
| 1 | −29 | 12 |
| 2 | 22 | −22 |
| 3 | −12 | 29 |
| 4 | 0 | −31 |
| 5 | 12 | 29 |
| 6 | −22 | −22 |
| 7 | 29 | 12 |
| 8 | −31 | 0 |
| 9 | 29 | −12 |
| 10 | −22 | 22 |
| 11 | 12 | −29 |
| 12 | 0 | 31 |
| 13 | −12 | −29 |
| 14 | 22 | 22 |
| 15 | −29 | −12 |
| 16 | 31 | 0 |
| 17 | −29 | 12 |
| 18 | 22 | −22 |
| 19 | −12 | 29 |
| 20 | 0 | −31 |
| 21 | 12 | 29 |
| 22 | −22 | −22 |
| 23 | 29 | 12 |
| 24 | −31 | 0 |

-continued

| NCO phase of 48 $f_x$ clock | cos | sin |
|---|---|---|
| 25 | 29 | −12 |
| 26 | −22 | 22 |
| 27 | 12 | −29 |
| 28 | 0 | 31 |
| 29 | −12 | −29 |
| 30 | 22 | 22 |
| 31 | −29 | −12 |
| 32 | 31 | 0 |
| 33 | −29 | 12 |
| 34 | 22 | −22 |
| 35 | −12 | 29 |
| 36 | 0 | −31 |
| 37 | 12 | 29 |
| 38 | −22 | −22 |
| 39 | 29 | 12 |
| 40 | −31 | 0 |
| 41 | 29 | −12 |
| 42 | −22 | 22 |
| 43 | 12 | −29 |
| 44 | 0 | 31 |
| 45 | −12 | −29 |
| 46 | 22 | 22 |
| 47 | −29 | −12. |

21. A receiver in a satellite navigational system, comprising:
   one or more processors; and
   at least one non-transitory computer-readable medium having program instructions recorded thereon, the program instructions configured to have the one or more processors control performance of one or more steps of:
      receiving a radiofrequency (RF) signal comprising transmissions from multiple satellites in a plurality of satellite system constellations;
      translating the RF signal comprising transmissions from multiple satellites in the plurality of satellite system constellations to an analog intermediate frequency (IF) signal comprising transmissions from the multiple satellites in the plurality of satellite system constellations by mixing the RF signal with a local oscillator-derived signal $LO_{RF}$;
      sampling the IF signal at a sampling rate $f_s$ to convert the analog IF signal to a digital IF signal; and
      separating out, for each satellite system, signals of satellites of the satellite system from the digital IF signal by mixing the digital IF signal with a numerically-controlled oscillator (NCO) output signal $f_{NCO\text{-}GNSS}$, the NCO output signal $f_{NCO\text{-}GNSS}$ having a frequency corresponding to a center of a transmission frequency of the satellites in the satellite system after translation into the IF.

22. A mobile terminal capable of receiving signals of multiple satellites from a plurality of navigational satellite system constellations, comprising:
   a receiver configured to receive a radiofrequency (RF) signal comprising signals of multiple satellites from the plurality of navigational satellite systems $GNSS_1$-$GNSS_n$;
   a complex mixer configured to mix the received RF signal with a local oscillator-derived signal $LO_{RF}$, generating an output of an analog intermediate frequency (IF) signal comprising the signals of the multiple satellites from the plurality of navigational satellite systems $GNSS_1$-$GNSS_n$;
   an analog-to-digital convertor (ADC) configured to sample the IF signal at a sampling rate $f_s$ to convert the analog IF signal to a digital IF signal; and
   a plurality of complex mixers, each complex mixer i being configured to mix the digital IF signal with a numerically-controlled oscillator (NCO) output signal $f_{NCO\text{-}GNSSi}$, the NCO output signal $f_{NCO\text{-}GNSSi}$ having a frequency corresponding to a center of a transmission frequency at IF of satellites in navigational satellite system $GNSS_i$ of the plurality of navigational satellite systems $GNSS_1$-$GNSS_n$, whereby the plurality of complex mixers can separate out signals of satellites in each of the plurality of navigational satellite systems $GNSS_1$-$GNSS_n$ from the digital IF signal.

23. The mobile terminal of claim 22, wherein a subset of one or more navigational satellite systems from the plurality of navigational satellite systems $GNSS_1$-$GNSS_n$ is selected, and wherein the complex mixers corresponding to any of the navigational satellite systems not in the subset of selected navigational satellite systems is disabled.

24. A method for a receiver to receive signals from a plurality of satellite system constellations, comprising:
   selecting a subset $GNSS_s$ of one or more satellite system constellations from a set of satellite system constellations $GNSS_1$-$GNSS_n$, wherein the receiver comprises circuitry configured to separate signals from satellites of each of the set of satellite system constellations $GNSS_1$-$GNSS_n$;
   separating out, for each satellite system in the subset $GNSS_s$, signals of satellites of the satellite system from a digital intermediate (IF) signal by mixing the digital IF signal with a numerically-controlled oscillator (NCO) output signal $f_{NCO\text{-}GNSS}$, the NCO output signal $f_{NCO\text{-}GNSS}$ having a frequency corresponding to a center of a transmission frequency of the satellites in the satellite system after translation to the IF;
   calculating a navigational/positional solution using the separated out signals; and
   when the calculated navigational/positional solution does not meet a minimum threshold, adding one or more previously unselected satellite system constellations from the set of satellite system constellations $GNSS_1$-$GNSS_n$ to the subset $GNSS_s$; and
   when one or more conditions exceeds a maximum threshold, removing one or more previously selected satellite system constellations from the subset $GNSS_s$.

25. The method of claim 24, wherein the minimum threshold is a certain degree of accuracy of the calculated navigational/positional solution.

26. The method of claim 24, wherein the maximum threshold is at least one of a certain percentage of power being consumed by the receiver circuitry for separating out the signals and a certain percentage of total power left in the receiver's system.

* * * * *